(12) United States Patent
Kim et al.

(10) Patent No.: US 10,520,329 B2
(45) Date of Patent: Dec. 31, 2019

(54) METHOD FOR PROVIDING PARKING LOCATION INFORMATION OF VEHICLE AND ELECTRONIC DEVICE THEREOF

(71) Applicant: Samsung Electronics Co., Ltd., Gyeonggi-do (KR)

(72) Inventors: Du Seok Kim, Yongin-si (KR); Hyun-Cheol Park, Suwon-si (KR); Ji Hoon Jang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 15/672,224

(22) Filed: Aug. 8, 2017

(65) Prior Publication Data

US 2018/0045535 A1 Feb. 15, 2018

(30) Foreign Application Priority Data

Aug. 10, 2016 (KR) ........................ 10-2016-0101684

(51) Int. Cl.
*G01C 21/36* (2006.01)
*G06K 9/00* (2006.01)
*G08G 1/005* (2006.01)
*H04W 4/44* (2018.01)
*H04W 4/02* (2018.01)
(Continued)

(52) U.S. Cl.
CPC ....... *G01C 21/3685* (2013.01); *G01C 21/206* (2013.01); *G01C 21/3602* (2013.01); *G06K 9/00791* (2013.01); *G08G 1/005* (2013.01); *G08G 1/205* (2013.01); *H04W 4/025* (2013.01); *H04W 4/44* (2018.02); *H04W 4/80* (2018.02)

(58) Field of Classification Search
CPC .............. G01C 21/3685; G01C 21/206; G01C 21/3602; H04W 4/44; H04W 4/025; H04W 4/80; G06K 9/00791; G08G 1/005; G08G 1/205
USPC .......................................................... 701/444
See application file for complete search history.

(56) References Cited

U.S. PATENT DOCUMENTS 9,730,010 B2 * 8/2017 Yu ........................... H04W 4/02
2009/0251333 A1 10/2009 Itani et al.
(Continued)

FOREIGN PATENT DOCUMENTS

JP 4178154 B2 11/2008
JP 2009205191 A 9/2009
(Continued)

OTHER PUBLICATIONS

International Search Report and Written Opinion for International Application No. PCT/KR2017/008656, dated Oct. 23, 2017. (8 pages).

*Primary Examiner* — Marthe Y Marc-Coleman

(57) ABSTRACT

A method for operating of an electronic device includes detecting when a vehicle enters a parking lot and obtaining image information when the vehicle is detected. The method also includes generating image information of an object including information indicating a parking section based on the obtained image information and identifying information related to a parking location of the vehicle based on the image information of the object. The information related to the parking location of the vehicle is outputted. The electronic device provides a parking location of the vehicle without a device pre-installed in a parking lot.

20 Claims, 23 Drawing Sheets

(51) Int. Cl.
*G08G 1/00* (2006.01)
*G01C 21/20* (2006.01)
*H04W 4/80* (2018.01)

(56) References Cited

U.S. PATENT DOCUMENTS

| | | | | |
|---|---|---|---|---|
| 2009/0303079 | A1* | 12/2009 | Khim | G08G 1/065 |
| | | | | 340/932.2 |
| 2011/0022301 | A1 | 1/2011 | Lee | |
| 2011/0261200 | A1* | 10/2011 | Kanning | G01S 5/0027 |
| | | | | 348/148 |
| 2012/0316774 | A1 | 12/2012 | Yariv et al. | |
| 2014/0072178 | A1* | 3/2014 | Carbonell | G06K 9/00785 |
| | | | | 382/105 |
| 2016/0046285 | A1* | 2/2016 | Kim | G08G 1/133 |
| | | | | 340/932.2 |

FOREIGN PATENT DOCUMENTS

| | | | |
|---|---|---|---|
| KR | 1020140023470 A | 2/2014 | |
| KR | 20150013422 A | 2/2015 | |
| KR | 20150093065 A | 8/2015 | |
| KR | 1020150093065 A | 8/2015 | |
| WO | WO-2015170821 A1 * | 11/2015 | ............. B60R 25/04 |

* cited by examiner

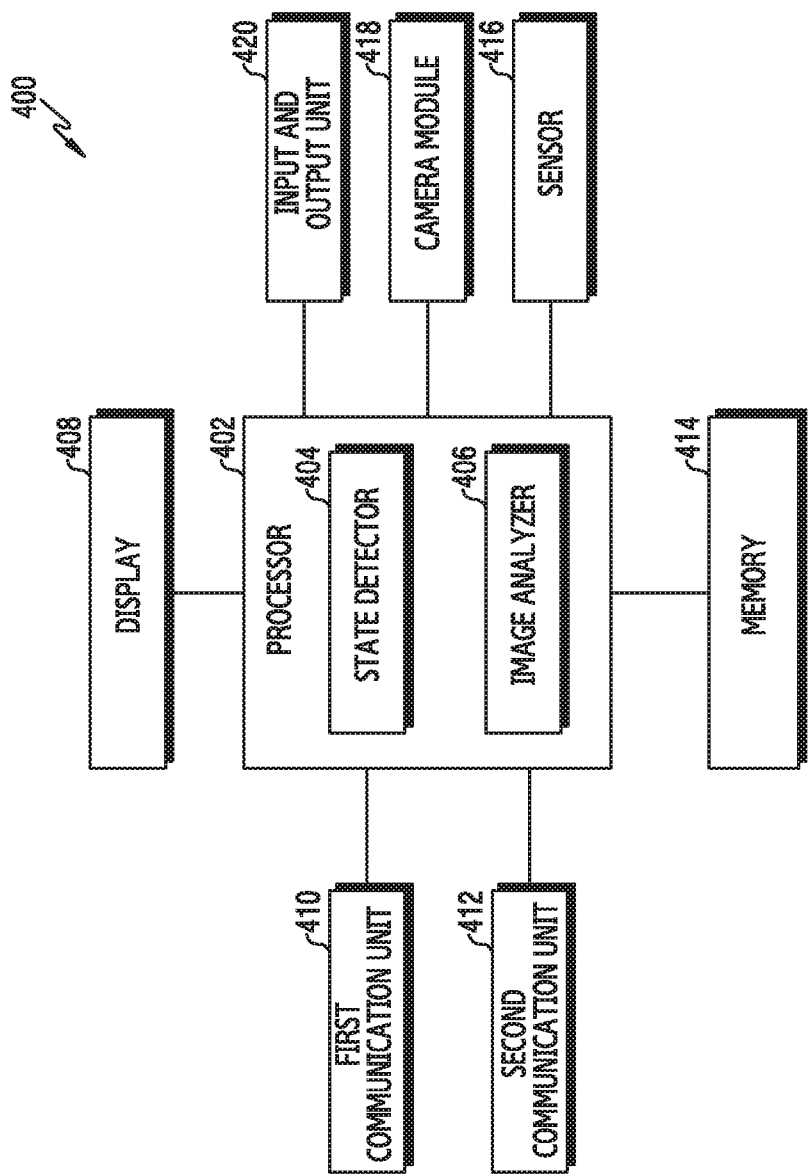

METHOD FOR PROVIDING PARKING LOCATION INFORMATION OF VEHICLE AND ELECTRONIC DEVICE THEREOF

CROSS-REFERENCE TO RELATED APPLICATION(S) AND CLAIM OF PRIORITY

The present application is related to and claims priority under 35 U.S.C. § 119 to an application filed in the Korean Intellectual Property Office on Aug. 10, 2016, and assigned Serial No. 10-2016-0101684, the contents of which are incorporated herein by reference.

TECHNICAL FIELD

Exemplary embodiments of the present disclosure relate to a method for recognizing a parking location and an electronic device thereof, and more particularly, to a method for providing a location of a parked vehicle without assistance from an infrastructure pre-installed in a parking lot, and an electronic device thereof.

BACKGROUND

In the case of a place where many vehicles are densely placed, such as a department store, a cultural facility, or an apartment complex, it may not be easy to find a parking location of one's own vehicle. In particular, in the case of a large parking lot, parking locations are classified by floors (for example, B2 or a second basement) and sections (for example, 075) and thus it may be difficult for a vehicle owner to remember a parking location.

Accordingly, a vehicle owner may use a camera which is pre-installed in a parking lot in order to find a parking location of his/her own vehicle. For example, an optical character reader (OCR) device shoots a vehicle entering a parking lot with a camera and recognizes a number plate of the vehicle through optical character reading and analysis. The OCR device grasps a parking location of a vehicle and provides the location to a user.

Since the above-described example may be applied to parking lots where sensors or cameras are pre-installed, a separate system and a separate service may be required. In addition, as personal vehicles are continuously observed through cameras of a parking lot, privacy may be invaded.

SUMMARY

To address the above-discussed deficiencies, it is a primary object to provide an apparatus and a method for providing a location of a parked vehicle to a user while protecting user's privacy.

Another aspect of the present disclosure provides an apparatus and a method for providing a location of a parked vehicle to a user without installing a separate sensor and a separate camera in a parking lot.

Another aspect of the present disclosure provides an apparatus and a method for providing a location of a parked vehicle to a user by shooting a parking place using a mobile device such as an external camera device mounted on the vehicle to determine a location of a parked vehicle or a smartphone, and analyzing the parking place.

Another aspect of the present disclosure provides an apparatus and a method for providing a location of a parked vehicle to a user by interlocking an electronic device and an external server.

Another aspect of the present disclosure provides an apparatus and a method for identifying character information extracted from image information obtained after a vehicle enters a parking lot by classifying the character information into information indicating a floor and information indicating a section.

According to an aspect of the present disclosure, an electronic device includes: a processor configured to, when it is detected that a vehicle enters a parking lot, obtain image information, generate image information of an object including information indicating a parking section based on the image information, identify information related to a parking location of the vehicle based on the image information of the object, and output the information related to the parking location of the vehicle; and a memory configured to store at least one of the image information, the image information of the object, and the information related to the parking location of the vehicle.

According to another aspect of the present disclosure, a method for operating of an electronic device includes: when it is detected that a vehicle enters a parking lot, obtaining image information; generating image information of an object including information indicating a parking section based on the image information; identifying information related to a parking location of the vehicle based on the image information of the object; and outputting the information related to the parking location of the vehicle.

According to another aspect of the present disclosure, an electronic device includes: a processor configured to obtain at least one piece of image information when it is detected that a vehicle enters a parking lot; and a communication unit configured to transmit the at least one piece of image information to a server and to receive information including a result of analyzing the at least one piece of image information from the server. The processor may further be configured to identify information related to a parking location of the vehicle based on the information including the result of analyzing, and output the information related to the parking location of the vehicle. The electronic device may further include a memory configured to store at least one of the at least one piece of image information, the information including the result of analyzing, and the information related to the parking location of the vehicle.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4A illustrates an example of a functional configuration of an electronic device according to various embodiments of the present disclosure;

DETAILED DESCRIPTION

Figure 1:
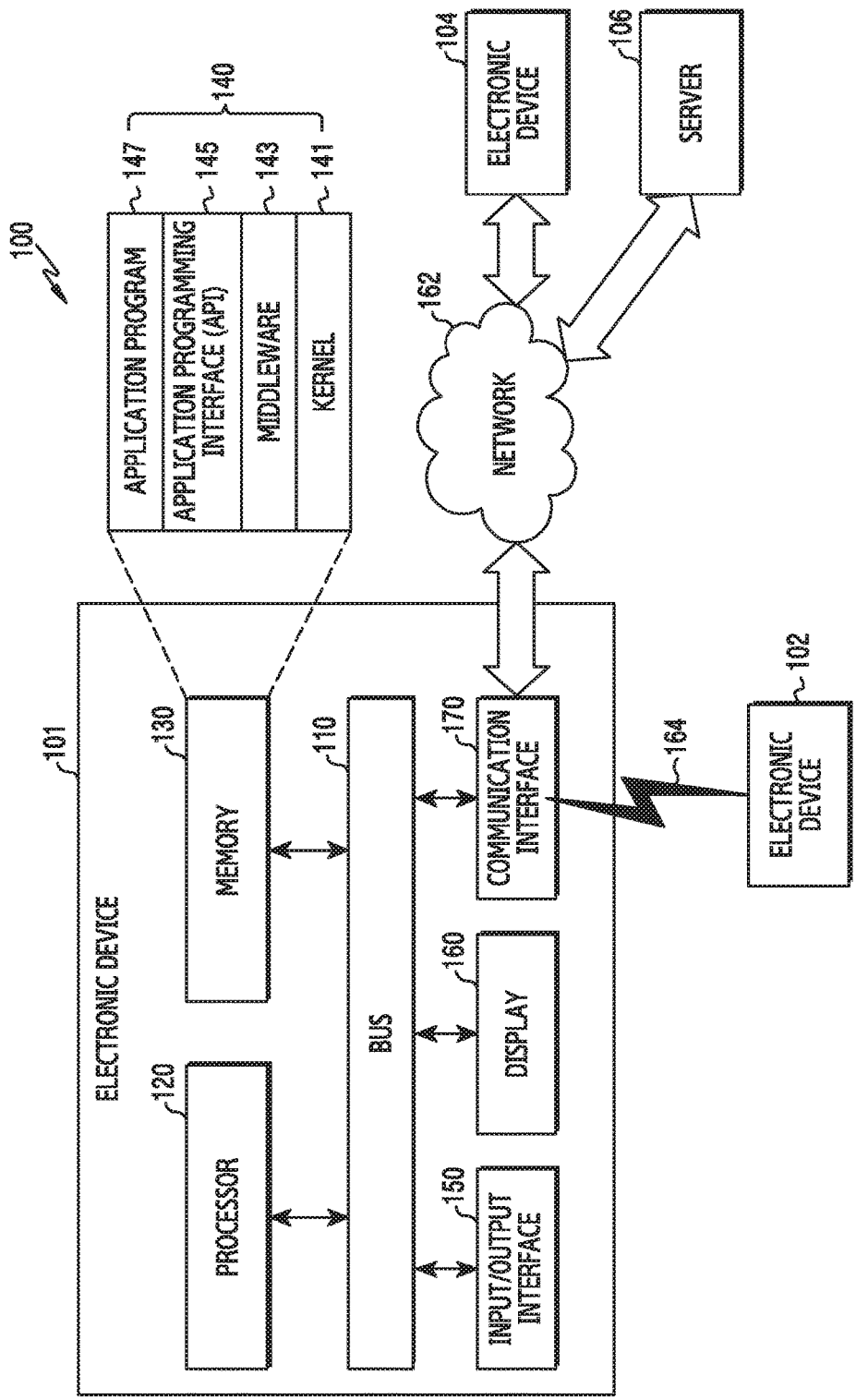
FIG. 1 illustrates an example of a network environment including an electronic device according to various embodiments of the present disclosure.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

An expression "configured to (or set)" used in the present disclosure may be used interchangeably with, for example, "suitable for," "having the capacity to," "designed to," "adapted to," "made to," or "capable of" according to a situation. A term "configured to (or set)" does not only mean "specifically designed to" by hardware. Alternatively, in some situations, the expression "apparatus configured to" may mean that the apparatus "can" operate together with another apparatus or component. For example, a phrase "a processor configured (or set) to perform A, B, and C" may be a generic-purpose processor (such as a Central Processing Unit (CPU) or an application processor) that can perform a corresponding operation by executing at least one software program stored at an exclusive processor (such as an embedded processor) for performing a corresponding operation or at a memory device.

An electronic device according to embodiments of the present disclosure, may be embodied as, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG 3 (MP3) player, a medical equipment, a camera, and a wearable device. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit. The electronic device may be embodied as at least one of, for example, a television, a Digital Versatile Disc (DVD) player, an audio device, a refrigerator, an air-conditioner, a cleaner, an oven, a microwave oven, a washing machine, an air cleaner, a set-top box, a home automation control panel, a security control panel, a media box (e.g., SAMSUNG HOMESYNC™, APPLE TV®, or GOOGLE TV®), a game console (e.g., XBOX®, PLAYSTATION®), an electronic dictionary, an electronic key, a camcorder, and an electronic frame.

In another embodiment, the electronic device may be embodied as at least one of various medical devices (such as, various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data Recorder (FDR), a vehicle infotainment device, electronic equipment for ship (such as, a navigation device for ship and gyro compass), avionics, a security device, a head unit for a vehicle, an industrial or home robot, a drone, an Automated Teller Machine (ATM) of a financial institution, a Point Of Sales (POS) device of a store, and an Internet of Things (IoT) device (e.g., a light bulb, various sensors, a sprinkler device, a fire alarm, a thermostat, a street light, a toaster, sports equipment, a hot water tank, a heater, and a boiler). According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device). An electronic device, according to an embodiment, can be a flexible electronic device or a combination of two or more of the foregoing various devices. An electronic device, according to an embodiment of the present disclosure, is not limited to the foregoing devices may be embodied as a newly developed electronic device. The term "user", as used herein, can refer to a person using an electronic device or a device using an electronic device (e.g., an artificial intelligence electronic device).

Referring initially to FIG. 1, an electronic device 101 resides in a network environment 100. The electronic device 101 can include a bus 110, a processor 120, a memory 130, an input/output interface 150, a display 160, and a communication interface 170. The electronic device 101 may be provided without at least one of the components, or may include at least one additional component. The bus 110 can include a circuit for connecting the components 120 through 170 and delivering communication signals (e.g., control messages or data) therebetween. The processor 120 can include one or more of a CPU, an application processor, and a communication processor (CP). The processor 120, for example, can perform an operation or data processing with respect to control and/or communication of at least another component of the electronic device 101.

The memory 130 can include a volatile and/or nonvolatile memory. The memory 130, for example, can store commands or data relating to at least another component of the electronic device 101. According to an embodiment, the memory 130 can store software and/or a program 140. The program 140 can include, for example, a kernel 141, middleware 143, an Application Programming Interface (API) 145, and/or an application program (or "application") 147. At least part of the kernel 141, the middleware 143, or the API 145 can be referred to as an Operating System (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control. The input/output interface 150, for example, can deliver commands or data inputted from a user or another external device to other component(s) of the electronic device 101, or output commands or data inputted from the other component(s) of the electronic device 101 to the user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part. The communication interface 170, for example, can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over a network 162 through wireless communication or wired communication.

The wireless communication, for example, can include cellular communication using at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). The wireless communication can include, for example, at least one of WI-FI®, BLUETOOTH®, Bluetooth Low Energy (BLE), ZIGBEE®, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), Beidou navigation satellite system (BEIDOU), or GALILEO (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include a telecommunications network, for example, at least one of computer network (e.g., LAN or WAN), Internet, and telephone network.

Each of the first and second external electronic devices 102 and 104 can be of the same as or of a different type from that of the electronic device 101. According to embodiments of the present disclosure, all or part of operations executed in the electronic device 101 can be executed by another electronic device or a plurality of electronic devices (e.g., the electronic device 102 or 104, or the server 106). To perform a function or service automatically or by request, instead of performing the function or the service by the electronic device 101, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and send its result to the electronic device 101. The electronic device 101 can provide the requested function or service by processing the received result. In doing so, for example, cloud computing, distributed computing, or client-server computing techniques can be used.

Figure 2:
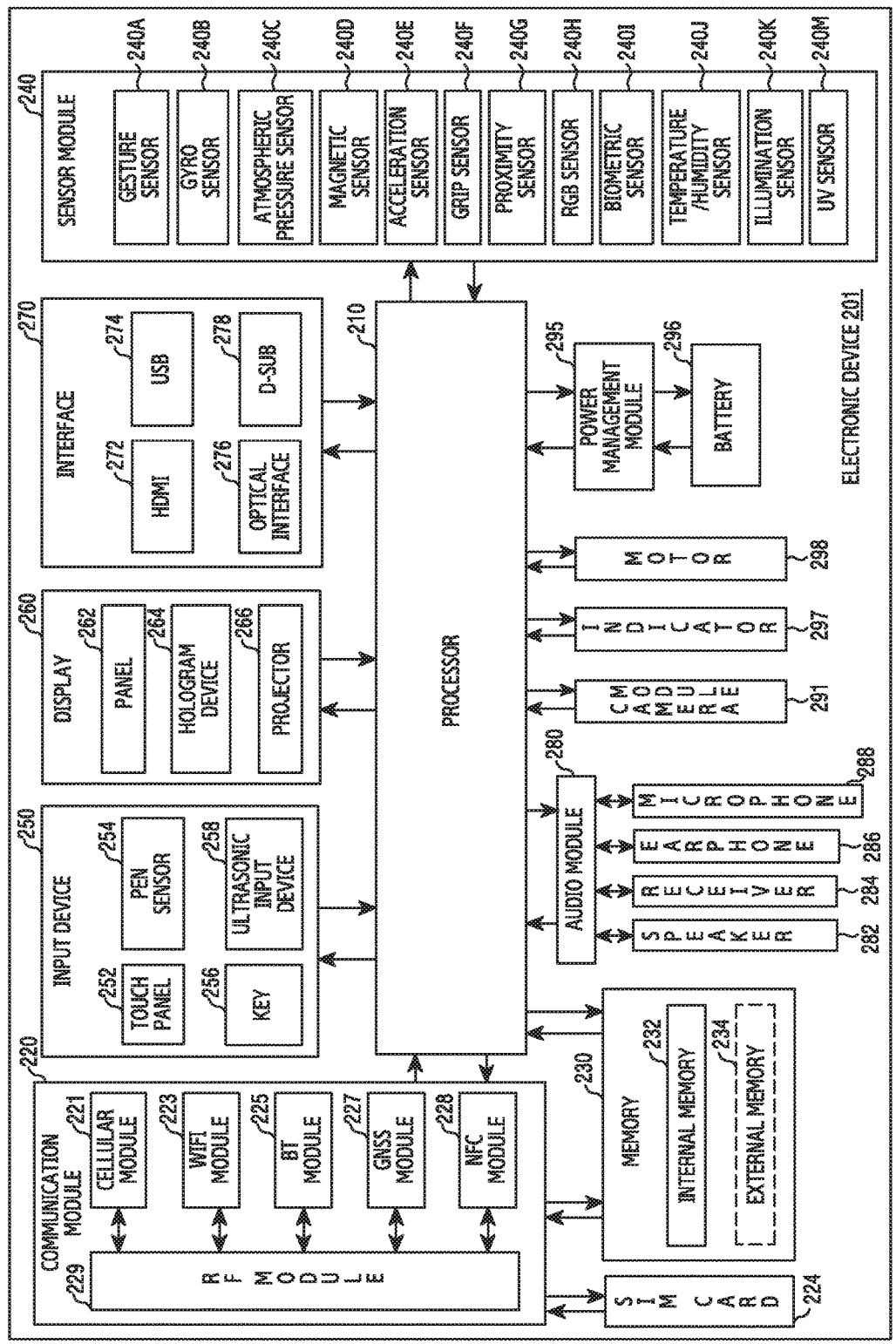
FIG. 2 illustrates an example of a block diagram of an electronic device according to various embodiments of the present disclosure.

FIG. 2 illustrates a block diagram of an electronic device 201 according to an embodiment of the present disclosure. The electronic device 201, for example, can include all or part of the above-described electronic device 101 of FIG. 1. The electronic device 201 includes one or more processors (e.g., an AP) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. The processor 210, for example, can control a plurality of hardware or software components connected to the processor 210, and also can perform various data processing and operations by executing an OS or an application program. The processor 210 can be implemented with a System on Chip (SoC), for example. The processor 210 can further include a Graphic Processing Unit (GPU) and/or an image signal processor. The processor 210 may include at least part (e.g., a cellular module 221) of the components shown in FIG. 2. The processor 210 can load commands or data received from at least one other component (e.g., a nonvolatile memory) into a volatile memory, process them, and store various data in the nonvolatile memory.

The communication module 220 can have the same or similar configuration to the communication interface 170 of FIG. 1. The communication module 220 can include, for example, the cellular module 221, a WiFi module 223, a Bluetooth (BT) module 225, a GNSS module 227, an NFC module 228, and an RF module 229. The cellular module 221, for example, can provide voice call, video call, Short Message Service (SMS), or Internet service through a communication network. The cellular module 221 can identify and authenticate the electronic device 201 in a communication network by using the SIM (e.g., a SIM card) 224. The cellular module 221 can perform at least part of a function that the processor 210 provides. The cellular module 221 can further include a CP. At least some (e.g., two or more) of the cellular module 221, the WiFi module 223, the BT module 225, the GNSS module 227, and the NFC module 228 can be included in one Integrated Circuit (IC) or an IC package. The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another embodiment, at least one of the cellular module 221, the WiFi module 223, the BT module 225, the GNSS module 227, and the NFC module 228 can transmit/receive an RF signal through an additional RF module. The SIM 224, for example, can include a card including a SIM or an embedded SIM, and also can contain unique identification information (e.g., an Integrated Circuit Card Identifier (ICCID)) or subscriber information (e.g., an International Mobile Subscriber Identity (IMSI)).

The memory 230 (e.g., the memory 130) can include at least one of an internal memory 232 and an external memory 234. The internal memory 232 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), Multi-Media Card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, and an Ultra Violet (UV) sensor 240M. Additionally or alternately, the sensor module 240 can include an E-nose sensor, an Electromyography (EMG) sensor, an Electroencephalogram (EEG) sensor, an Electrocardiogram (ECG) sensor, an Infrared (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 can include at least one of a touch panel 252, a (digital) pen sensor 254, a key 256, and an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone 288 and check data corresponding to the detected ultrasonic waves.

The display 260 (e.g., the display 160) can include at least one of a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252. The hologram device 264 can show three-dimensional images in the air by using the interference of light. The projector 266 can display an image by projecting light on a screen. The screen, for example, can be placed inside or outside the electronic device 201. The interface 270 can include, for example, an HDMI 272, a USB 274, an optical interface 276, or a D-subminiature (D-sub) 278. The interface 270 can be included in, for example, the communication interface 170 of FIG. 1. Additionally or alternately, the interface 270 can include a Mobile High-Definition Link (MHL) interface, a SD card/MMC interface, or an Infrared Data Association (IrDA) standard interface.

The audio module 280, for example, can convert sounds into electrical signals and convert electrical signals into sounds. At least some components of the audio module 280 can be included in, for example, the input/output interface 150 of FIG. 1. The audio module 280 can process sound information inputted or outputted through a speaker 282, a receiver 284, an earphone 286, or the microphone 288. The camera module 291, as a device for capturing still images and videos, can include one or more image sensors (e.g., a front sensor or a rear sensor), a lens, an Image Signal Processor (ISP), or a flash (e.g., an LED or a xenon lamp). The power management module 295, for example, can manage the power of the electronic device 201. According to an embodiment of the present disclosure, the power management module 295 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB), Digital Video Broadcasting (DVB), or MEDIAFLO™. Each of the above-described components of the electronic device can be configured with at least one component and the name of a corresponding component can vary according to the kind of an electronic device. According to an embodiment of the present disclosure, an electronic device (e.g., the electronic device 201) can be configured to include at least one of the above-described components or an additional component, or to not include some of the above-described components. Additionally, some of components in an electronic device are configured as one entity, so that functions of previous corresponding components are performed identically.

Figure 3:
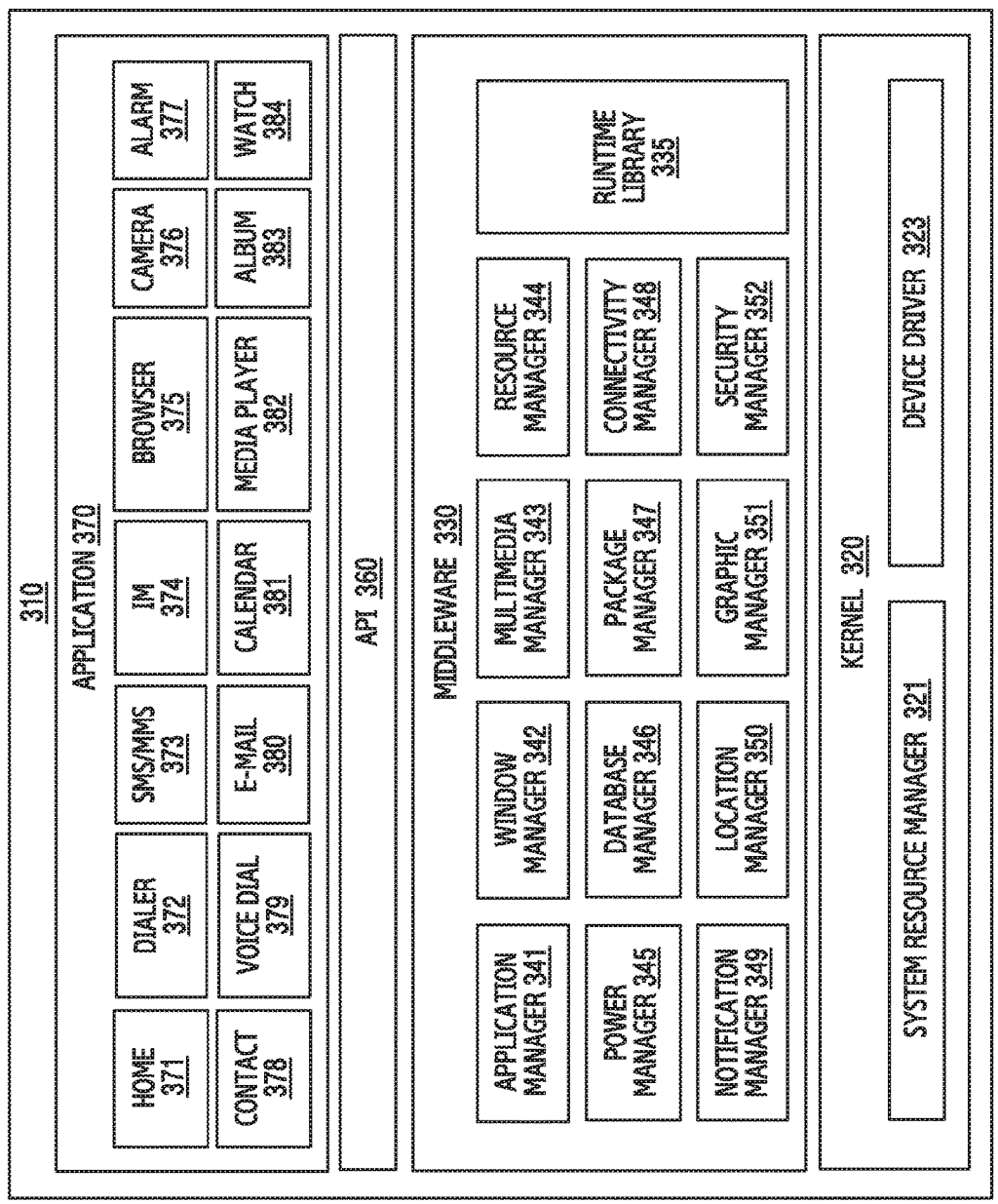
FIG. 3 illustrates an example of a block diagram of a program module according to various embodiments of the present disclosure.

FIG. 3 is a block diagram of a program module according to an embodiment of the present disclosure. A program module 310 (e.g., the program 140) can include an OS for controlling a resource relating to an electronic device (e.g., the electronic device 101) and/or various applications (e.g., the application program 147) running on the OS. The OS can include, for example, ANDROID®, iOS®, WINDOWS®, SYMBIAN®, TIZEN®, or SAMSUNG BADA®. Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least part of the program module 310 can be preloaded on an electronic device or can be downloaded from an external electronic device (e.g., the electronic device 102, 104, or the server 106).

The kernel 320 includes, for example, at least one of a system resource manager 321 and/or a device driver 323. The system resource manager 321 can control, allocate, or retrieve a system resource. According to an embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a WiFi driver, an audio driver, or an Inter-Process Communication (IPC) driver. The middleware 330, for example, can provide a function commonly required by the application 370, or can provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a complier to add a new function through a programming language while the application 370 is running. The runtime library 335 can manage input/output, manage memory, or arithmetic function processing. The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 3740 or a memory space. The power manager 345 can manage the capacity or power of the battery and provide power information for an operation of the electronic device. The power manager 345 can operate together with a Basic Input/Output System (BIOS). The database manager 346 can create, search, or modify a database used in the application 370. The package manager 347 can manage installation or updating of an application distributed in a package file format.

The connectivity manger 348 can manage, for example, a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide, for example, system security or user authentication. The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components. The API 360, as a set of API programming functions, can be provided as another configuration according to the OS. For example, ANDROID® or iOS® can provide one API set for each platform, and TIZEN® can provide two or more API sets for each platform.

The application 370 can include at least one of a home 371, a dialer 372, an SMS/Multimedia Messaging System (MMS) 373, an Instant Message (IM) 374, a browser 375, a camera 376, an alarm 377, a contact 378, a voice dial 379, an e-mail 380, a calendar 381, a media player 382, an album 383, a watch 384, health care (e.g., measure an exercise amount or blood sugar level), or environmental information (e.g., air pressure, humidity, or temperature information) provision application. The application 370 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

FIG. 4A illustrates an example of a functional configuration of an electronic device 400 according various embodiments of the present disclosure.

According to various embodiments, the electronic device 400 may include a processor 402, a display 408, a first communication unit 410, a second communication unit 412, a memory 414, a sensor 416, a camera module 418, and an input and output unit 420. In a certain embodiment, the electronic device 400 may omit at least one of the elements or may further include other elements.

The processor 402 may control an overall operation of the electronic device 400. The processor 402 may correspond to the processor 120 of FIG. 1 and the processor 210 of FIG. 2. In addition, the processor 402 may include one or more of a central processing unit (CPU), an application processor (AP), or a communication processor (CP). Herein, the processor 402 may perform arithmetic operations or data processing regarding control and/or communication of at least one of the other elements of the electronic device 400.

The processor 402 may include a state detector 404 and an image analyzer 406. The state detector 404 may detect a state of a vehicle (for example, whether a vehicle is driven, parked, or enters a parking lot). The image analyzer 406 may analyze an image which is obtained using the camera module 418 or an external device installed in a vehicle (for example, a black box). The image analyzer 406 will be described in detail below with reference to FIG. 4B.

The display 408 may correspond to the display 160 of FIG. 1 and the display 260 of FIG. 2. Herein, the display 408 may include a liquid crystal display (LCD), a light emitting diode (LED) display, an organic LED (OLED) display, or a micro electro mechanical system (MEMS) display, or an electronic paper display. According to various embodiments of the present disclosure, the display 408 may display parking location information of a vehicle.

The electronic device 400 may communicate with external devices (for example, a server, a wearable device, or the like) using the first communication unit 410 or the second communication unit 412. The first communication unit 410 and the second communication unit 412 may correspond to the communication interface 170 of FIG. 1 and the communication module 220 of FIG. 2.

According to various embodiments, the first communication unit 410 is a short range wireless communication unit and may perform communication such as BLUETOOTH®, Bluetooth low energy, WI-FI®, WIGIG®, or the like. Herein, the first communication unit 410 may include a WiFi module 223, a Bluetooth module 225, a GNSS module 227, and an NFC module 228. For example, the electronic device 400 may be connected with a vehicle or a wearable device using the first communication unit 410. Alternatively, the electronic device 400 may transmit information related to a parking location of a vehicle to a wearable device using the first communication unit 410.

According to various embodiments, the electronic device 400 may wirelessly access the Internet and establish a wireless LAN link with the server 106 using the second communication unit 412. Herein, the second communication unit 412 may include an RF module 229, a WiFi module 223, and a cellular module 221. For example, the electronic device 400 may transmit image information to the server 106 using the second communication unit 412, and may receive a result of analyzing the image information or information related to a parking location of a vehicle from the server 106.

The memory 414 may store information related to a parking location of a vehicle. The memory 414 may correspond to the memory 130 of FIG. 1 and the memory 230 of FIG. 2. For example, the information related to the parking location of the vehicle may be image information such as an image which is obtained using the camera module 418 or an image which is received from an external device installed in the vehicle. Alternatively, the information related to the parking location of the vehicle may be pillar information of a parking lot which is processed by the image analyzer 406, information related to characters written on the pillar, or a result of analyzing an image which is received from the server 106.

The sensor 416 may detect an operation state or a surrounding situation of the electronic device 400, and may convert the detected information into an electric signal. The sensor 416 may correspond to the sensor module 240 of FIG. 2. For example, the sensor 416 may include the pressure sensor 240C, the magnetic sensor 240D, the acceleration sensor 240E, and the illuminance sensor 240K. According to various embodiments of the present disclosure, the sensor 416 may detect a location of a vehicle, illuminance of an environment in which a vehicle is driven, or a change in a magnetic value using the sensors.

The camera module 418 is a device which is able to shoot a still image and a moving image. For example, when it is determined that a vehicle enters a parking lot, the processor 402 may shoot a moving image of the parking lot using the camera module 418. Alternatively, when it is determined that the vehicle is parked, the processor 402 may shoot a still image of the parking lot using the camera module 418.

The input and output unit 420 may serve as an interface which is capable of forwarding a command or data inputted from a user or an external device to the other element(s) of the electronic device 400. Herein, the input and output unit 420 may correspond to the input/output interface 150 of FIG. 1, and may include the audio module 280, the speaker 282, the receiver 284, the earphone 286, or the microphone of FIG. 2.

According to various embodiments, the processor 402 may detect whether a vehicle enters a parking lot or not. In this case, the processor 402 may use a GNSS module (for example, the GNSS module 227) included in the first communication unit 410 or various sensors included in the sensor 416, such as an illuminance sensor, a magnetic sensor, or the like.

According to various embodiments, the processor 402 may obtain image information. In this case, the processor 402 may use the camera module 418 or an external device (for example, a black box) installed in the vehicle. Herein, when image information of a parking lot is obtained using the external device or the like installed in the vehicle, the processor 402 may receive the image information from the external device installed in the vehicle through the first communication unit 410 or the second communication unit 412.

According to various embodiments, the processor 402 may detect whether the vehicle is parked or not. In this case, the processor 402 may use the Bluetooth module included in the first communication unit 410 or the acceleration sensor included in the sensor 416.

According to various embodiments, the processor 402 may identify final parking location information of the vehicle. In this case, the processor 402 may identify parking location information based on a result of analyzing an image which is obtained after the vehicle enters the parking lot and an image which is obtained at the time when the vehicle is parked or thereafter. To achieve this, the processor 402 may obtain and analyze the image simultaneously. For example, the processor 402 may analyze image information which is obtained after a vehicle enters a parking lot in real time. Alternatively, the processor 402 may analyze images after obtaining all images. For example, when an image is obtained at the time when the vehicle is parked or thereafter, the processor 02 may analyze an image which is obtained after the vehicle enters the parking lot, the image obtained at the time when the vehicle is parked, or the image obtained thereafter.

According to various embodiments, the processor 402 may output the parking location information of the vehicle. For example, the processor 402 may display the parking location information of the vehicle using the display 260. Alternatively, the processor 402 may transmit the parking location information to another device (for example, a wearable device) using the Bluetooth module or the NFC module included in the first communication unit 410. Alternatively, when a user input of requesting a voice output is detected, the processor 402 may output the location information of the vehicle in the form of a sound using the audio module included in the input and output unit 420.

According to various embodiments, the processor 402 may transmit image information to the server 106. In this case, the processor 402 may use the second communication unit 412. Herein, when image information is transmitted to the server 106, the processor 402 may receive a result of analyzing the image from the server 106. After receiving the result of analyzing the image from the server 106, the processor 402 may identify final parking location information of the vehicle based on the received result of analyzing the image and output the identified final parking location information of the vehicle.

According to various embodiments, when it is determined that the vehicle is parked, the processor 402 may execute the camera 376. Herein, when an image is obtained using the camera 376, the processor 402 may extract character information from the obtained image and analyze the character information. Thereafter, the processor 402 may output the parking location information of the vehicle using the analyzed character information.

Figure 4B:
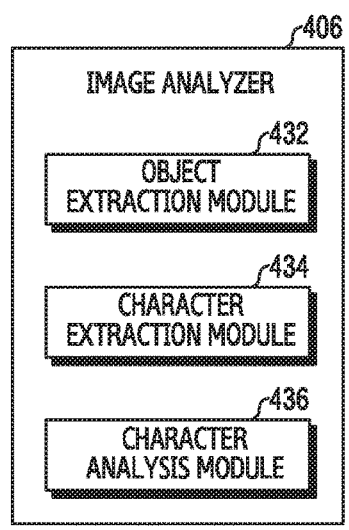
FIG. 4B illustrates an example of a functional configuration of an image analyzer according to various embodiments of the present disclosure.

FIG. 4B illustrates an example of a configuration of the image analyzer 406 according to various embodiments of the present disclosure. Referring to FIG. 4B, the image analyzer 406 may include an object extraction module 432, a character extraction module 434, and a character analysis module 436.

The object extraction module 432 may generate object information including information regarding a section of the parking lot in the image information. For example, the object extraction module 432 may extract pillar information of the parking lot from the image information. In this case, the pillar information of the parking lot may refer to an image regarding a pillar. Specifically, the object extraction module 432 may determine a candidate pillar region in the image information, determine whether the candidate pillar region includes a pillar, and finally determine the target region as a pillar.

The character extraction module 434 may extract characters from the image information. In this case, the character extraction module 434 may binarize an inputted image and recognize a contour, and then may use a character recognition algorithm (for example, a convolutional neural network (CNN)).

The character analysis module 436 may classify the extracted characters according to patterns. For example, the character analysis module 436 may classify the extracted characters into characters indicating floor information of the parking lot and characters indicating section information. Herein, the section is a unit for classifying a single floor into physical spaces, and one floor may include a plurality of sections.

Figure 5:
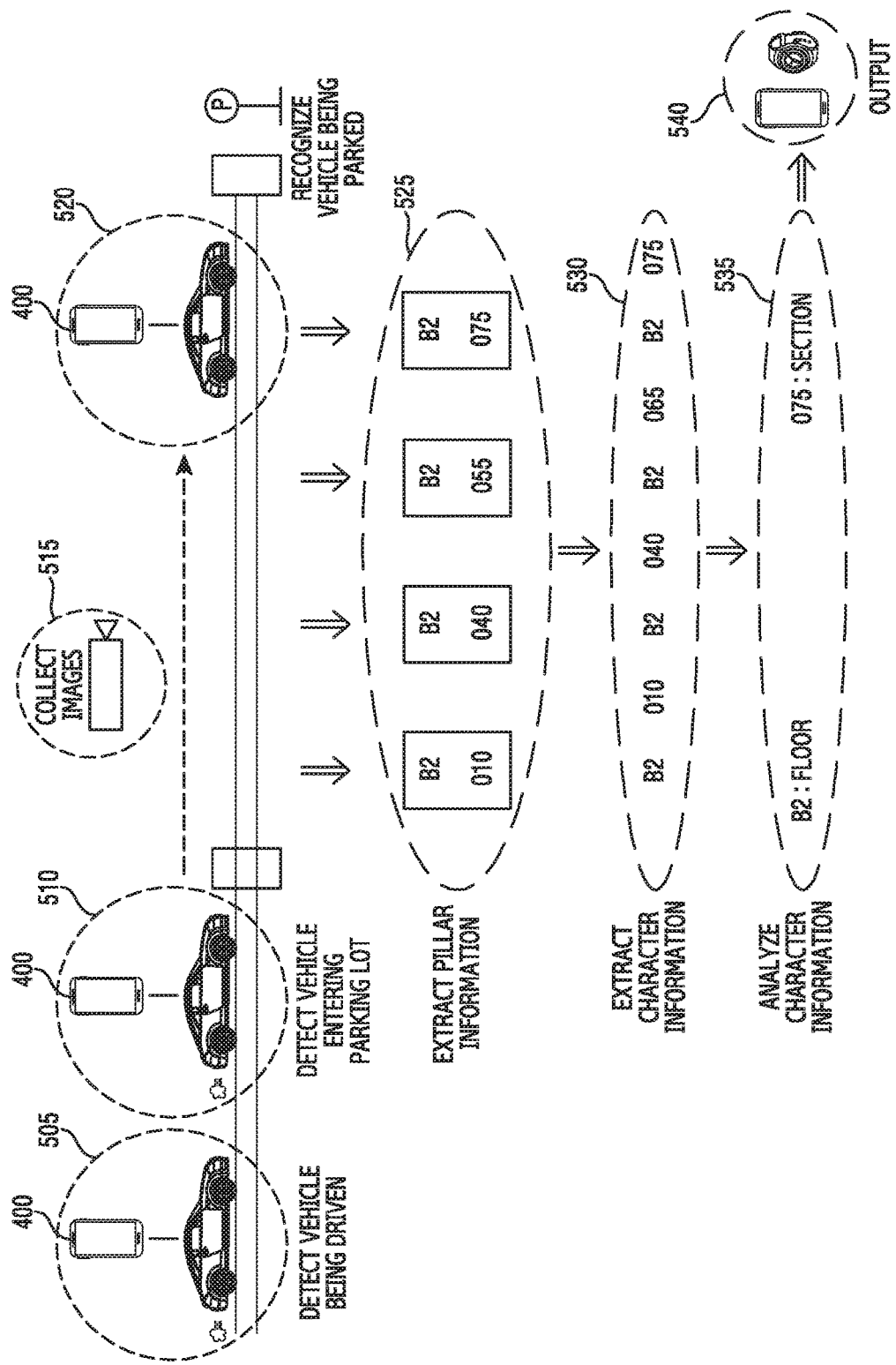
FIG. 5 illustrates an example of a procedure of providing parking location information of a vehicle according to various embodiments of the present disclosure.

FIG. 5 illustrates an example of a procedure of providing parking location information of a vehicle according to various embodiments of the present disclosure. In FIG. 5, it is assumed that the electronic device 400 collects an image when the vehicle enters a parking lot. In addition, it is assumed that the electronic device 400 performs operations of extracting pillar information, extracting characters, and analyzing the characters.

The electronic device 400 may detect whether the vehicle is driven or not (step 505). For example, the electronic device 400 may determine whether the vehicle is driven based on a state of a Bluetooth connection with the vehicle. In this case, the electronic device 400 may use a time of a Bluetooth connection with the vehicle or a connection pattern. According to various embodiments, the electronic device 400 may execute an algorithm for providing a parking location of the vehicle only when it is determined that the vehicle is a user's own vehicle by analyzing the pattern of the Bluetooth connection with the vehicle. In another example, the electronic device 400 may use an analysis of a vibration pattern of the vehicle. For example, the electronic device 400 may detect a continuous vibration of the vehicle using the acceleration sensor 240E and may analyze the pattern of the detected vibration.

The electronic device 400 may detect whether the vehicle enters a parking lot or not (step 510). Herein, the parking lot may be an indoor parking lot or an outdoor parking lot. That is, when there exists a pillar displaying a sign (for example, a character) regarding a section or an alternative object even in an indoor parking lot, various embodiments of the present disclosure can be applied. For example, in the case of an indoor parking lot, the electronic device 400 may determine whether the vehicle enters the parking lot by measuring a GPS signal, measuring illuminance, or measuring a geomagnetic change value. In another example, in the case of an outdoor parking lot, the electronic device 400 may determine whether the vehicle enters the parking lot by measuring a location of the vehicle by measuring a GPS signal.

When it is determined that the vehicle enters the parking lot, the electronic device 400 may collect an image (step 515). In this case, the electronic device 400 may use the camera module 418. Alternatively, the electronic device 400 may obtain an image regarding the parking lot which is shot by an external device (for example, a black box or the like) installed in the vehicle. According to various embodiments, the electronic device may continue to collect images until the vehicle is parked or the vehicle exits from the parking lot without being parked.

The electronic device 400 may recognize a parking state of the vehicle (step 520). For example, the electronic device 400 may determine that the vehicle is parked by detecting that a Bluetooth connection is disconnected. Alternatively, when the electronic device 400 determines that the vibration of the vehicle is not generated during a predetermined time using the acceleration sensor, the electronic device 400 may determine that the vehicle is parked. Alternatively, the electronic device 400 may detect that the vehicle stalls or the state of the vehicle is changed to a parking mode using an external device (for example, a black box, on-board diagnostics (OBD)-2, or the like) installed in the vehicle.

The electronic device 400 may extract pillar information from the collected images (step 525). Herein, the pillar information may include information related to a parking location. For example, the electronic device 400 may recognize pillar information in the image information using an edge or color characteristic, and may recognize the pillar information from various pillar images through a machine learning technique which uses a learned model. As shown in FIG. 5, the electronic device 400 may extract first pillar information (B2 010), second pillar information (B2 040), third pillar information (B2 055), and fourth pillar information (B2 075) from the collected images. Herein, B2 indicates a second basement, and 010, 040, 055, and 075 indicate parking sections. According to various embodiments, the electronic device 400 may detect identification information displaying the parking location of the vehicle in the parking lot in addition to the pillars.

The electronic device 400 may extract character information from the pillar information extracted in step 525 (step 530). Herein, the character information may be character information related to the parking location. In this case, the electronic device 400 may use contour recognition and image noise removal techniques.

The electronic device 400 may analyze the character information extracted in step 530 (step 535). For example, the electronic device 400 may classify the character information based on the frequency of each piece of the extracted character information. As shown in FIG. 5, the electronic device 400 may classify character information (B2 075) regarding the final parking location into information (B2) indicating a floor and information (075) indicating a section.

The electronic device 400 may output the parking location information analyzed in step 535 (step 540). For example, the electronic device 400 may display the parking location information of the vehicle using the display 408. Alternatively, the electronic device 400 may output the parking location information of the vehicle as voice information using the audio module included in the input and output unit 420. In addition, the electronic device 400 may transmit the parking location information of the vehicle to another device (for example, a wearable device, a galaxy gear, or the like).

Referring to FIG. 5, the electronic device 400 performs pillar information extraction (step 525), character information extraction (step 530), and character information analysis (step 535) after recognizing that the vehicle is parked (step 520). However, according to various embodiments, the electronic device 400 may perform pillar information extraction, character information extraction, and character information analysis in real time every time an image is collected after the vehicle enters the parking lot.

According to the parking location identifying procedure described above with reference to FIG. 5, pillar information is extracted from images. Herein, the pillar refers to an object which displays information regarding a parking location. That is, in the description of FIG. 5, the pillar is merely an example, and, according to various embodiments, an object extracted from the image may be substituted with an object other than the pillar. For example, at least one object including information regarding a parking location may be a structure constituting a parking lot or a part of the structure (for example, a pillar, a wall, a floor), an installation installed in the parking lot (for example, a sign board, an electronic display board, a printed matter, or the like), or a similar physical object including information regarding a parking section.

Information regarding the object may be extracted based on a morphological characteristic (for example, a form including a vertical line, a form including a horizontal line, a form including a curved line, or the like) owned by the at least one object. Accordingly, the object may be defined as an object having a form, a shape, or color of a predetermined pattern. For example, when the at least one object is a pillar, the processor 402 may extract image information regarding the pillar of the parking lot from the obtained image information based on the morphological characteristic of the pillar including a vertical form.

The object extracted from the image refers to a part of an image that has a high possibility of having information regarding a parking location. Accordingly, extracting the information on the object from the image may refer to extracting a region including location information in the parking lot from the image. That is, extracting the information regarding the object from the image may be interpreted as having the same meaning as generating a partial image including location information.

Figure 6:
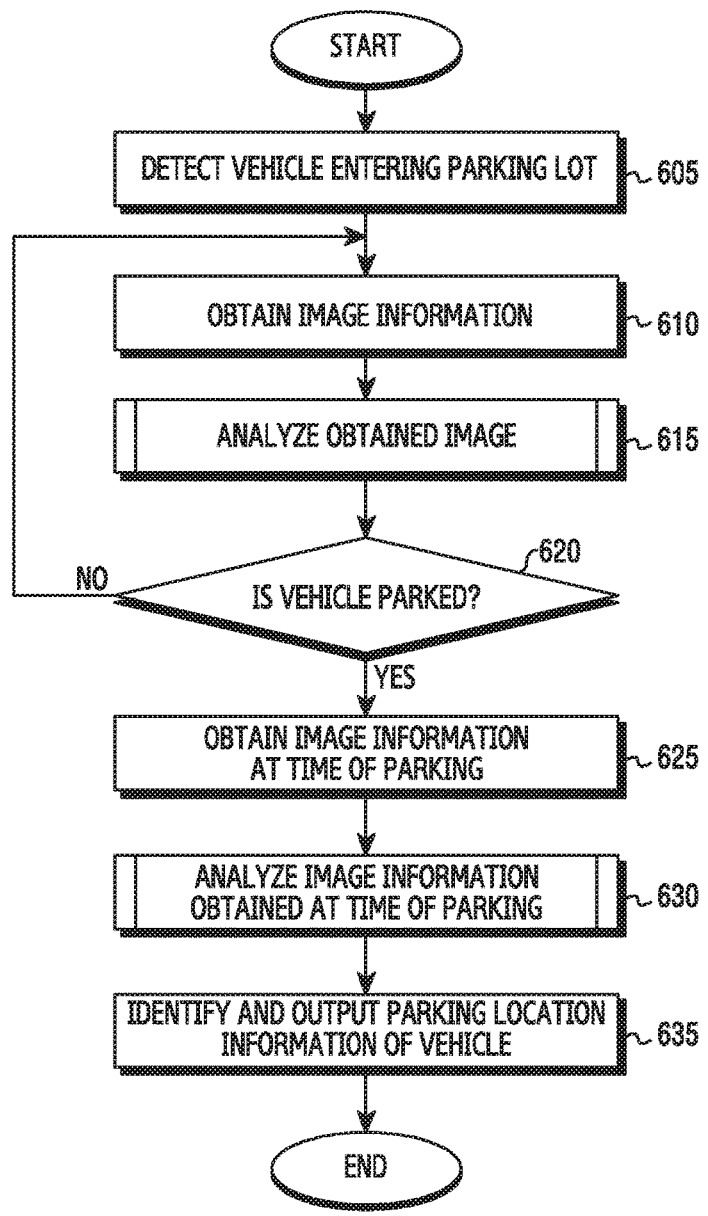
FIG. 6 illustrates an example of an operation process of the electronic device according to various embodiments of the present disclosure.

FIG. 6 illustrates an example of an operation process of the electronic device 400 according various embodiments of the present disclosure. In FIG. 6, it is assumed that the electronic device 400 obtains image information and analyzes the obtained image information in real time.

Referring to FIG. 6, the processor 402 may detect whether the vehicle enters a parking lot (step 605). For example, the processor 402 may determine whether the vehicle enters the parking lot by measuring a GPS signal using the first communication unit 410. When it is determined whether the vehicles enters the parking lot by measuring the GPS signal, the processor 402 may determine whether the vehicle enters the parking lot by recognizing an increase or a decrease in the sensitivity of the GPS signal. In another example, the processor 402 may determine whether the vehicle enters the parking lot by detecting a change in an illuminance value using the sensor 416, a change in a magnetic value, or a beacon signal transmitted from an electronic device installed at a specific location (for example, an entrance) in the parking lot.

The processor 402 may obtain image information (step 610). For example, when it is determined that the electronic device 400 is held on the vehicle based on a result of measuring by an acceleration sensor (for example, the acceleration sensor 240E) included in the sensor 416, the processor 402 may use the camera module 418 to obtain the image information. In another example, the processor 402 may obtain the image information by receiving the image information which is obtained by shooting by an external device (for example, a black box) installed in the vehicle using the first communication unit 410.

The processor 402 may analyze the obtained image (step 615). Specifically, the processor 402 may detect pillar information, extract character information, and analyze based on a pattern of the extracted character information in order to analyze the obtained image. The image analysis procedure will be described in detail below with reference to FIGS. 9 to 15.

After analyzing the image information, the processor 402 may determine whether the vehicle is parked or not (step 620). Herein, it may be determined whether the vehicle is parked by detecting a signal indicating that the vehicle is parked. For example, the processor 402 may determine that the vehicle is parked by detecting that a Bluetooth connection is disconnected using a Bluetooth module (for example, the BT module 225) included in the first communication unit 410. Alternatively, the processor 402 may determine that the vehicle is parked by detecting that a vibration is not generated in the vehicle using an acceleration sensor (for example, the acceleration sensor 240E) included in the sensor 416. In addition, to determine whether the vehicle is parked, the processor 402 may use an external device (for example, OBD-2, a black box or the like) installed in the vehicle.

When it is determined that the vehicle is not parked, the processor 402 may return to step 610 to obtain image information. Accordingly, the processor 402 may continue to obtain image information until the vehicle is parked.

On the other hand, when it is determined that the vehicle is parked, the processor 402 may obtain image information at the time when the vehicle is parked (step 625). In this case, the processor 402 may obtain the image information at the time when the vehicle is parked using the camera module 418 or an external device (for example, a black box or the like) installed in the vehicle.

When the image information at the time when the vehicle is parked is obtained, the processor 402 may analyze the image information obtained at the time when the vehicle is parked (step 630). Herein, the processor 402 may use the object extraction module 432, the character extraction module 434, and the character analysis module 436 included in the image analyzer 406. The procedure of analyzing the image information will be described in detail below with reference to FIGS. 9 to 15. Alternatively, according to another embodiment, the processor 402 may use an OCR technique.

After analyzing at least one image obtained before the vehicle is parked and the image information obtained after the vehicle is parked, the processor 402 may identify parking location information of the vehicle based on the result of analyzing, and output the identified parking location information (step S635).

Herein, the processor 402 may generate image information of at least one object including information regarding a parking section in the obtained image information, and then may identify final parking location information of the vehicle based on the generated image information of the at least one object. For example, the processor 402 may identify information indicating a floor and information indicating a section of a location where the vehicle is parked. Alternatively, when character information is extracted from the image information obtained at the time of parking using the OCR technique, the processor 402 may identify the information indicating the floor and the information indicating the section of the location where the vehicle is parked by identifying a correspondence between the extracted character information and the result of analyzing the image information which is obtained before the vehicle is parked.

After identifying the final parking location information of the vehicle, the processor 402 may output the parking location information of the vehicle. In this case, the processor 402 may use the display 408. For example, the processor 402 may display an image related to the final parking location of the vehicle and character information related to the final parking location of the vehicle using the display 408. Alternatively, the processor 402 may display only the character information related to the final parking location. In addition, the processor 402 may output voice information related to the final parking location using the audio module included in the input and output unit 420.

According to various embodiments, when the final parking location information is identified, the processor 402 may output the parking location information of the vehicle using a notification window or an application related to a parking location.

In the embodiment illustrated in FIG. 6, step 625 is performed after step 620 without any special condition. However, in other embodiments, the processor 402 may output the parking location information of the vehicle additionally or alternatively in step 625 when a user's request is detected. For example, when the user requests the parking location information of the vehicle in user's voice, the processor 402 may output at least one of character information, a photo, and a voice related to the parking location of the vehicle. Alternatively, when the user requests the parking location information of the vehicle by executing an application, the processor 402 may output at least one of character information, a photo, and a voice related to the parking location of the vehicle using the application in response to the user's input.

According to various embodiments, the processor 402 may transmit the parking location information of the vehicle to another device (for example, a wearable device, a galaxy gear, or the like). For example, the processor 402 may transmit the parking location information of the vehicle to an external wearable device using the first communication unit 410. In this case, the parking location information of the vehicle may be displayed on the wearable device.

Figure 7:
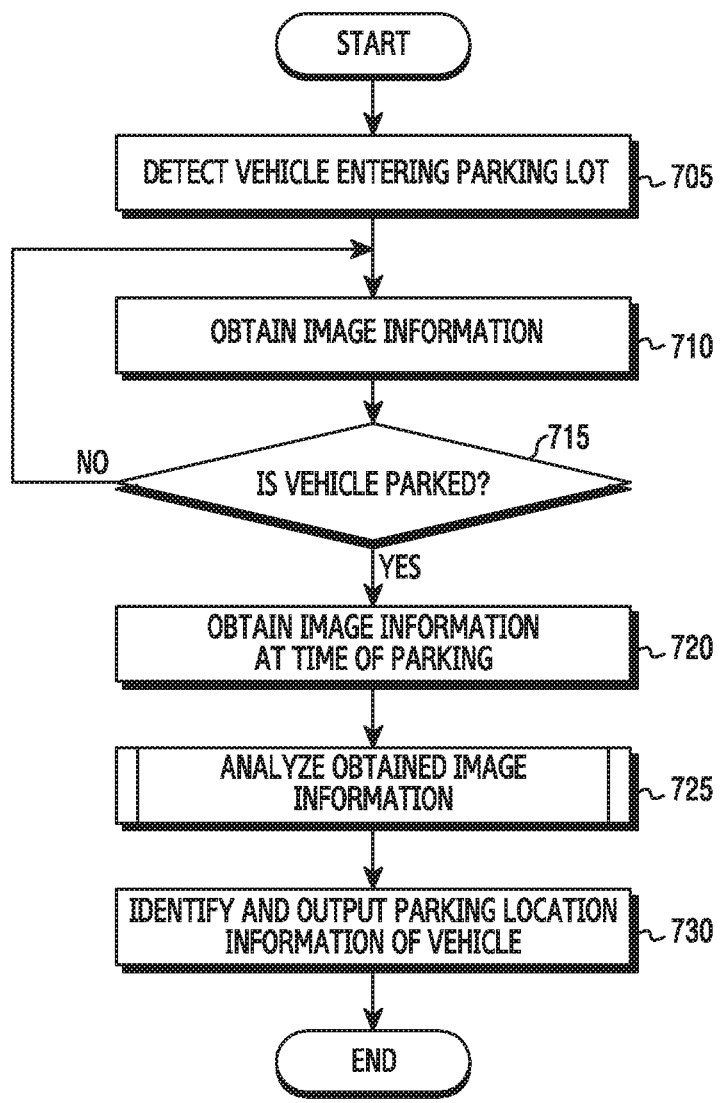
FIG. 7 illustrates another example of an operation process of the electronic device according to various embodiments of the present disclosure.

FIG. 7 illustrates another example of an operation process of the electronic device 400 according to various embodiments of the present disclosure. In FIG. 7, it is assumed that the electronic device 400 analyzes obtained image information when all pieces of image information are obtained.

Referring to FIG. 7, the processor 402 may detect whether the vehicle enters a parking lot (step 705). Herein, the processor 402 may use a GNSS module (for example, the GNSS module 227) included in the first communication unit 410, or an illuminance sensor (for example, the illuminance sensor 240K) or a magnetic sensor (for example, the magnetic sensor 240D) included in the sensor 416. Alternatively, the processor 402 may detect whether the vehicle enters the parking lot by receiving a beacon signal transmitted from an electronic device installed at a specific location in the parking lot.

The processor 402 may obtain image information (step 710). Herein, in order to obtain the image information, the processor 402 may use the camera module 418 or may receive image information which is obtained by shooting by an external device (for example, a black box) installed in the vehicle using the first communication unit 410. The operation in step 710 may be similar to the image obtaining operation of step 610 of FIG. 6.

After obtaining the image information, the processor 402 may determine whether the vehicle is parked (step 715). Herein, it may be determined whether the vehicle is parked by detecting a signal indicating that the vehicle is parked. For example, the processor 402 may detect the signal indicating that the vehicle is parked using a Bluetooth module (for example, the BT module 225) included in the first communication unit 410, an acceleration sensor (for example, the acceleration sensor 240E) included in the sensor 416, or an external device (for example, OBD-2, a black box, or the like) installed in the vehicle.

When it is determined that the vehicle is not parked, the processor 402 may return to step 710 to obtain image information. That is, the processor 402 may continue to obtain image information until the vehicle is parked.

On the other hand, when it is determined that the vehicle is parked, the processor 402 may obtain image information at the time when the vehicle is parked (step 720). For example, the processor 402 may shoot the parked vehicle or its surroundings using the camera module 418, or may receive image information obtained at the time when the vehicle is parked from an external device (for example, a black box or the like) installed in the vehicle.

When the image information at the time when the vehicle is parked is obtained, the processor 402 may analyze all pieces of the obtained image information (step 725). Herein, the processor 402 may use the object extraction module 432, the character extraction module 434, and the character analysis module 436 included in the image analyzer 406. Pillar extraction, character extraction, and character analysis will be described in detail below with reference to FIGS. 9 to 15. Alternatively, the processor 402 may use an OCR technique.

When all pieces of the obtained image information are analyzed, the processor 402 may identify parking location information of the vehicle based on the result of analyzing, and output the identified parking location information (step 730).

Herein, the processor 402 may generate image information of at least one object including information regarding a parking section in the obtained image information, and then may identify final parking location information of the vehicle based on the generated image information of the at least one object.

The operation of identifying and outputting the parking location information of the vehicle in step 730 may be similar to the operation and the embodiments described in step 635 of FIG. 6.

Figure 8:
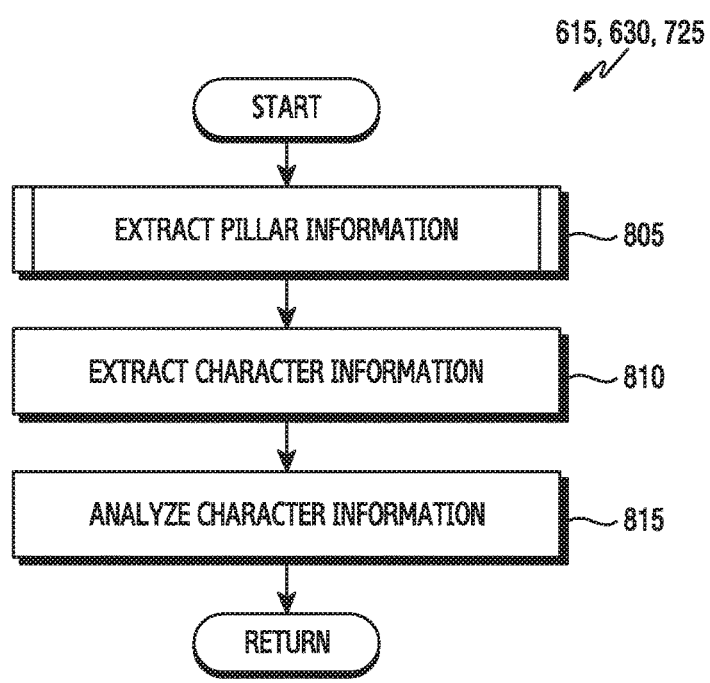
FIG. 8 illustrates an example of a process of analyzing an image in the electronic device according to various embodiments of the present disclosure.

FIG. 8 illustrates an example of a process of analyzing an image in the electronic device 400 according to various embodiments of the present disclosure. Referring to FIG. 8, when the electronic device 400 analyzes an image as in step 615 or step 630 of FIG. 6 or step 725 of FIG. 7, a following process may be performed.

When image information is obtained, the processor 402 may extract pillar information from the obtained image information (step 805). Herein, the pillar information may refer to an image regarding a pillar. For example, the processor 402 may extract pillar information displaying a parking section from the obtained image information using the object extraction module 432. In this case, the processor 402 may detect a candidate pillar region from the obtained image information, determine whether the detected candidate pillar region includes a pillar, and extract the target region as a pillar when the candidate pillar region includes a pillar. For example, the processor 402 may recognize the pillar information based on an edge or color characteristic of the image information. The procedure of the operation of extracting pillar information based on the edge characteristic will be described in detail below with reference to FIGS. 10 to 12. In addition, the processor 402 may recognize the pillar information from various pillar images through a machine learning technique using a learned model.

According to various embodiments, when an image is obtained, the processor 402 may extract a region including information related to a parking section from the obtained image. For example, the processor 402 may use a maximally stable extremal region (MSER) computer vision algorithm in the obtained image. Specifically, when a plurality of objects are close to one another horizontally in the plurality of MSERs included in the obtained image, the processor 402 may determine that these objects indicate location information of the parking lot. For example, the processor 402 may extract information regarding a sign board, a floor surface, or the like including information related to a parking section.

When the pillar information is extracted from the obtained image information, the processor 402 may extract character information included in the extracted pillar information (step 810). Herein, the processor 402 may use the character extraction module 434. More specifically, the processor 402 may binarize the extracted pillar information and recognize contours in the binarized pillar information, and then may extract character information by processing the recognized contours based on a convolutional neural network technique. The operation of extracting the character information will be described in detail below with reference to FIG. 14.

When the character information included in the pillar information is extracted, the processor 402 may analyze the extracted character information (step 815). In this case, to analyze the character information, the processor 402 may detect a pattern of the character information through a repetitive arithmetic operation. By doing so, the processor 402 may classify the extracted character information related to the parking location into character information indicating a floor and character information indicating a section. The procedure of analyzing the character information will be described in detail below with reference to FIG. 15.

Figure 9:
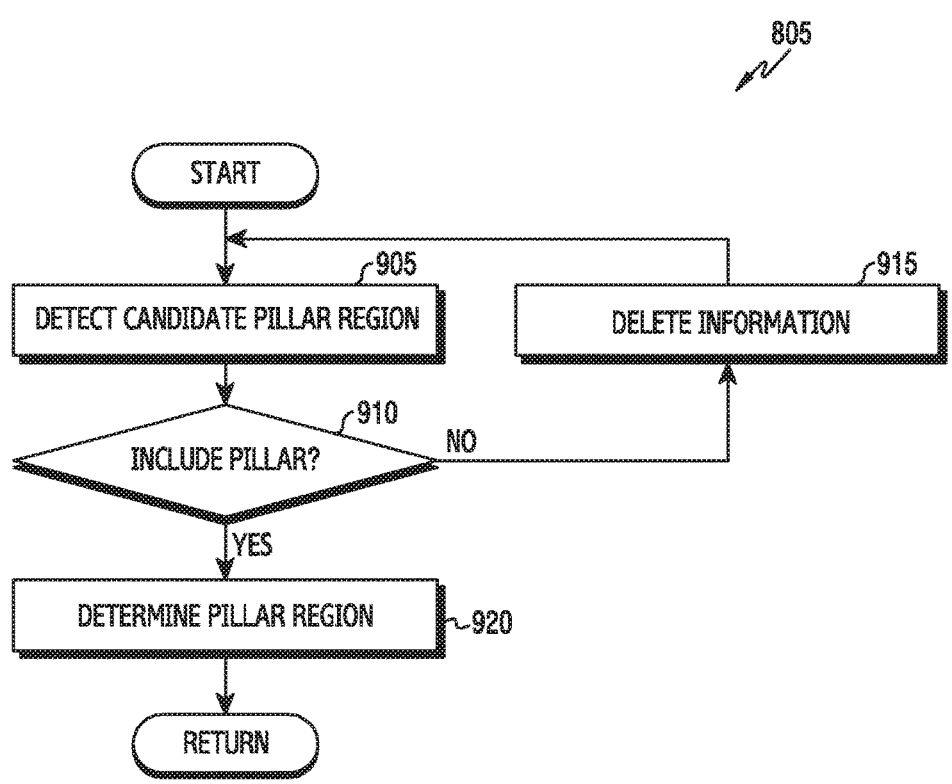
FIG. 9 illustrates an example of a process of extracting pillar information in the electronic device according to various embodiments of the present disclosure.
Figure 11:
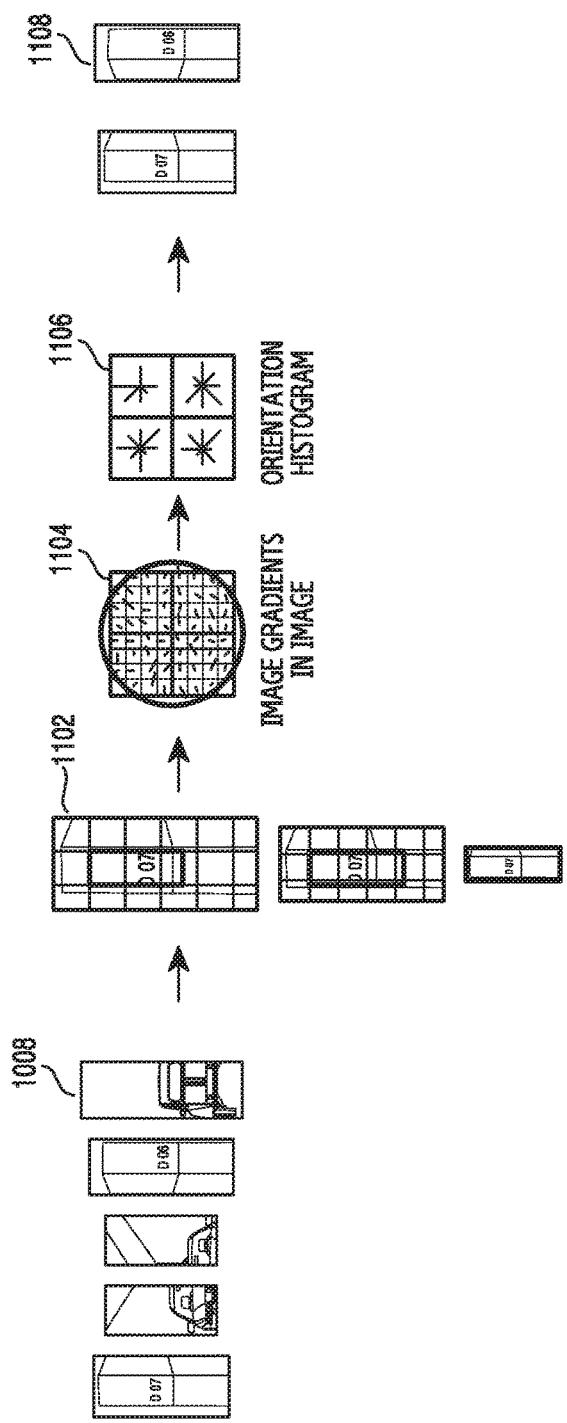
FIG. 11 illustrates an example of a process of determining whether a candidate pillar region includes a pillar in the electronic device according to various embodiments of the present disclosure.
Figure 12:
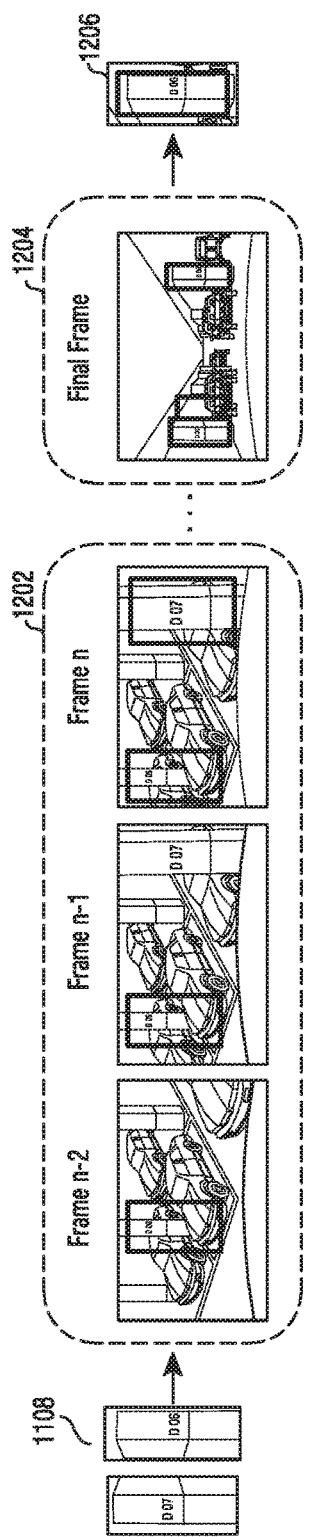
FIG. 12 illustrates an example of a process of determining a pillar region in the electronic device according to various embodiments of the present disclosure.

In the following description regarding FIGS. 9 to 12, a process of detecting pillar information in the electronic device according to various embodiments of the present disclosure will be described. FIG. 9 illustrates an example of a process of extracting pillar information in the electronic device 400 according to various embodiments of the present disclosure. In addition, FIGS. 10, 11, and 12 illustrate a process of detecting a candidate pillar region, a process of determining whether the candidate pillar region includes a pillar, and a process of determining a pillar region in the electronic device 400 according to various embodiments of the present disclosure.

Herein, the electronic device 400 may perform a following process when pillar information is extracted in step 805 of FIG. 8.

The processor 402 may detect a candidate pillar region from the obtained image information (step 905). In this case, the processor 402 may use an edge characteristic and a detailed process of this method will be described below with reference to FIG. 10.

Figure 10:
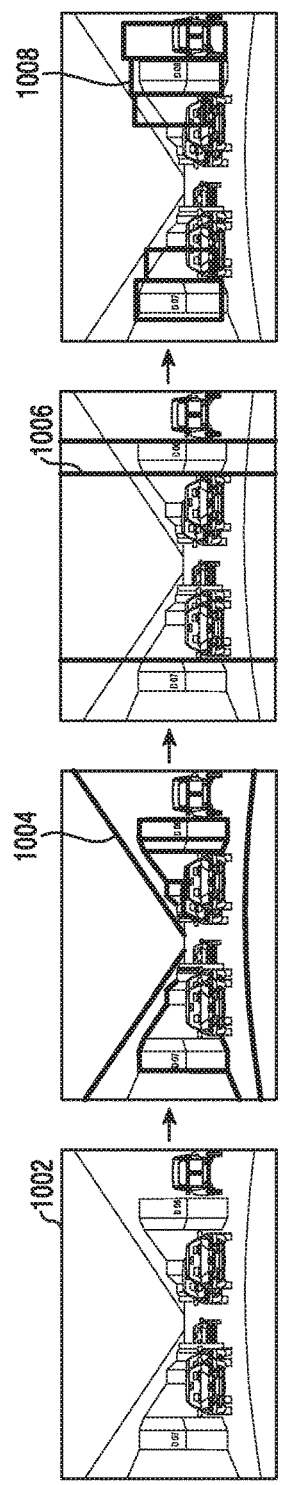
FIG. 10 illustrates an example of a process of detecting a candidate pillar region in the electronic device according to various embodiments of the present disclosure.

When an input image 1002 is inputted to the electronic device 400 as shown in FIG. 10, the processor 402 may generate edge information 1004 based on the input image as shown in FIG. 10. In this case, the processor 402 may detect edge components from the input image using various algorithms (for example, a Canny edge detection algorithm or a Sobel edge detection algorithm).

When the edge information 1004 is generated, the processor 402 may generate vertical line information 1006 based on the detected edge information as shown in FIG. 10. Herein, the processor 402 may detect vertical components from the detected edges using various transform techniques (for example, Hough Transform).

When vertical lines regarding the input image are detected, the processor 402 may generate candidate pillar region information 1008 as shown in FIG. 10. Herein, the candidate pillar region may refer to left and right regions with reference to the detected vertical lines within a predetermined range.

When the candidate pillar region is detected from the obtained image information, the processor 402 may determine whether the candidate pillar region includes a pillar (step 910). In this case, the processor 402 may use various image processing techniques and a detailed process thereof will be described below with reference to FIG. 11.

When the candidate pillar region information is generated, the processor 402 may generate region of interest (ROI) information 1102 regarding the detected candidate pillar region as shown in FIG. 11. For example, the processor 402 may scale the candidate pillar region information 1008 into several phases and then may detect the ROI by dividing by a predetermined size. Using the detected ROI, the processor 402 may analyze specific regions related to the parking section information.

When the ROI is detected, the processor 302 may detect a feature regarding the corresponding ROI. For example, the feature may be a feature of histogram of oriented gradients (HOG). Specifically, the processor 402 may measure gradients 1104 regarding the ROI on a pixel basis as shown in FIG. 11, and detect orientations 1106 of histogram using the measured gradients.

The processor 402 may determine whether the candidate pillar region includes a pillar based on the extracted HOG feature. According to one embodiment, the processor 402 may determine whether the candidate pillar region includes a pillar by determining a pillar score of a corresponding region through adaptive boost (AdaBoost) classification. In addition, according to another embodiment, the processor 402 may use a machine learning technique using a model related to a learned pillar form.

When it is determined that the candidate pillar region does not include a pillar, the processor 402 may delete information regarding the candidate pillar region which is determined not to include a pillar (step 915). When the information regarding the corresponding region is deleted, the processor 402 may return to step 905 to detect a candidate pillar region again. Herein, the corresponding region refers to the candidate pillar region which is determined not to include a pillar.

When it is determined that the candidate pillar region does not include a pillar, the information regarding the corresponding region is necessarily deleted in FIG. 9. However, the procedure of deleting the information regarding the corresponding region may be omitted according to an amount of load of the electronic device 400. In this case, the processor 402 may return to step 905 to detect a candidate pillar region again.

On the other hand, when it is determined that the candidate pillar region includes a pillar, the processor 402 may generate region information 1108 including the pillar included in the corresponding candidate pillar region as shown in FIG. 11. In this case, the processor 402 may determine the region including the pillar as a tracking target.

When the region information 1108 including the pillar is generated, the processor 402 may determine a pillar region. In this case, the processor 402 may use a tracking and scoring technique and a detailed process thereof will be described below with reference to FIG. 12.

As shown in FIG. 12, the processor 402 may perform continuous tracking 1202 with respect to the regions included in the region information 1108 including the pillar. In this case, the tracking 1202 may be performed by updating target regions by updating locations and sizes of the target regions to be tracked in reverse order of frames. For example, the processor 402 may detect the target regions to be tracked in order of frame n, frame n−1, and frame n−2.

As the target regions are updated, the processor 402 may update scores corresponding to the target regions. Herein, the score may be a metric which is used to determine a final pillar region.

As shown in FIG. 12, the processor 402 may determine a pillar region 1206 by tracking the target regions and updating the scores. Herein, the pillar region may refer to a region which exceeds a predetermined score threshold value. In addition, when the processor 402 scores with reference to a final frame 1204 which is obtained at the time of parking, a region having the highest score may be determined as a final parking pillar region.

Figure 13:
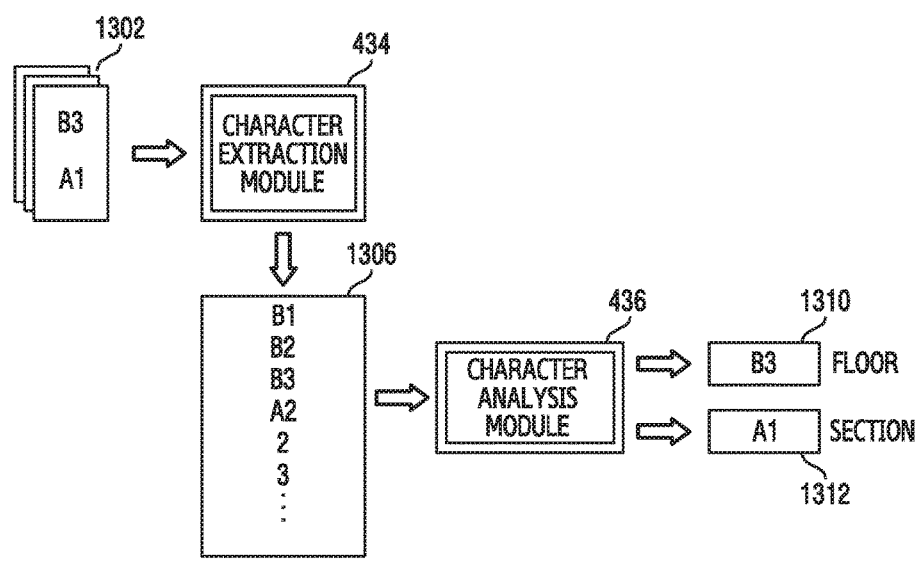
FIG. 13 illustrates examples of character extraction and analysis algorithms according to various embodiments of the present disclosure.

FIG. 13 illustrates examples of character extraction and analysis algorithms according to various embodiments of the present disclosure. In FIG. 13, the electronic device 400 may extract and analyze characters using the character extraction module 434 and the character analysis module 436.

Referring to FIG. 13, pillar images 1302 which are determined to include pillars may be inputted to the character extraction module 434. Herein, the pillar images 1302 refer to images including information regarding pillars. When the pillar images 1302 are inputted to the character extraction module 434, the character extraction module 434 extracts character information 1306 included in the pillar images 1302. In this case, the character extraction module 434 may use contour determination and convolutional neural network techniques.

After being extracted, the character information 1306 may be inputted to the character analysis module 436. When the character information 1306 is inputted to the character analysis module 436, the character analysis module 436 may analyze the character information 1306. For example, by analyzing the character information 1306, the character analysis module 436 may classify the character information into character information B3 1310 indicating a floor and character information A1 1312 indicating a section.

Figure 14:
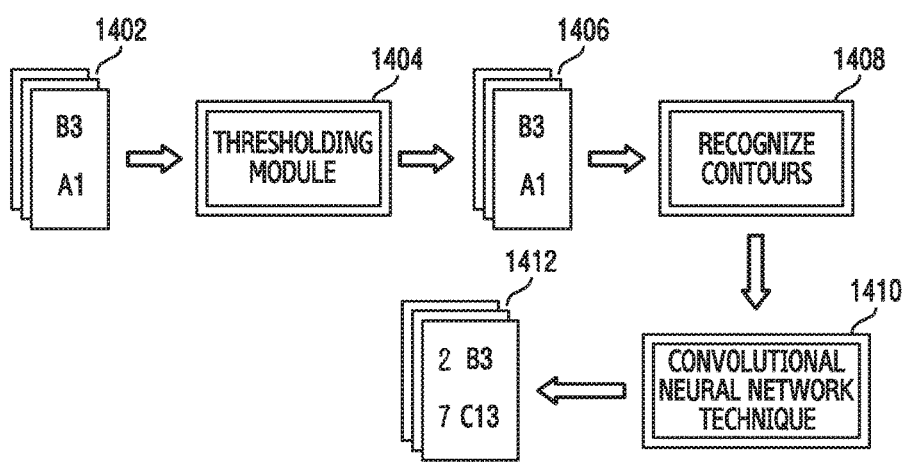
FIG. 14 illustrates an example of an operation process of a character extraction module according to various embodiments of the present disclosure.

FIG. 14 illustrates an example of an operation process of the character extraction module 434 according to various embodiments of the present disclosure.

Referring to FIG. 14, when an input of pillar images 1402 is detected, the electronic device 400 may binarize the pillar images 1402 using a thresholding module 1404 and generate binarized images 1406. For example, when a threshold value is set to "135," the electronic device 400 may determine values which are less than or equal to "135" as a background, and determine values which exceed "135" as character information.

The electronic device 400 may generate contour-recognized images by performing contour recognition 1408 with respect to the binarized images 1406. For example, the electronic device 400 may generate contour-recognized images by recognizing contours regarding "B3" included in the binarized images 1406.

After generating the contour-recognized images, the electronic device 400 may generate character information 1412 regarding the contour-recognized images using a convolutional neural network (CNN) technique 1410. In this case, the electronic device 400 may use a technique of recognizing contours as characters based on a repetitive arithmetic operation regarding the contour-recognized images. In addition, according to various embodiments, character recognition algorithms such as OCR, deep learning, erosion operation, dilation operation, or the like may be used in addition to the convolutional neural network technique. In addition, the generated character information 1412 may include information (for example, 2, 7) caused by an error in character recognition as well as effective information (for example, B3, C13).

Figure 15:
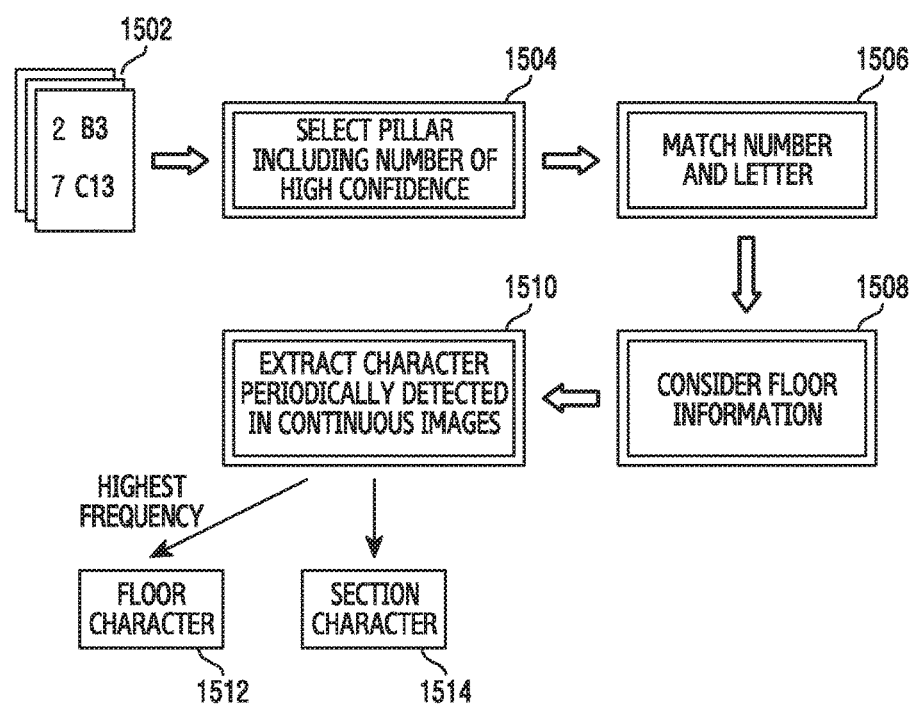
FIG. 15 illustrates an example of an operation process of a character analysis module according to various embodiments of the present disclosure.

FIG. 15 illustrates an example of an operation process of the character analysis module 436, 1308 according to various embodiments of the present disclosure.

Referring to FIG. 15, when an input of pillar images 1502 is detected, the electronic device 400 may select pillar images including numbers of high confidence using the character analysis module 436. Herein, the number of the high confidence may refer to a number which is determined to have high confidence through an arithmetic operation regarding recognized contours and corresponding numbers. For example, when the confidence of a number is 0, a corresponding character may be determined not to be a number, and, when the confidence of a number is 100, a corresponding character may be determined to be a number.

After the pillar images including the numbers of the high confidence are selected (1504), the electronic device 400 may match letters and numbers included in the selected pillar images with each other (1506). For example, when the selected pillar images include the letter "B," the electronic device 400 may generate "B3" by matching the letter "B" with number "3."

The electronic device 400 may consider only floor information in the information having numbers and letters matched with each other (1508). For example, when the letter matched with the numbers is "F" of the "floor" or "B" of the "basement," the electronic device 400 may consider the corresponding character information as floor information. Alternatively, the electronic device 400 may consider only one piece of floor information based on a pre-defined value using a pressure sensor included in the sensor 416.

When the floor information is considered, the electronic device 400 may extract character information which is periodically detected from continuous images (1510). Accordingly, the electronic device 400 may distinguish between a floor character 1512 and a section character 1514.

For example, when "B3" is most frequently detected from continuous images, "B3" may refer to the floor character 1512. In this case, the other character information (for example, A1, C13) detected from the continuous images may refer to the section character 1514.

Figure 16:
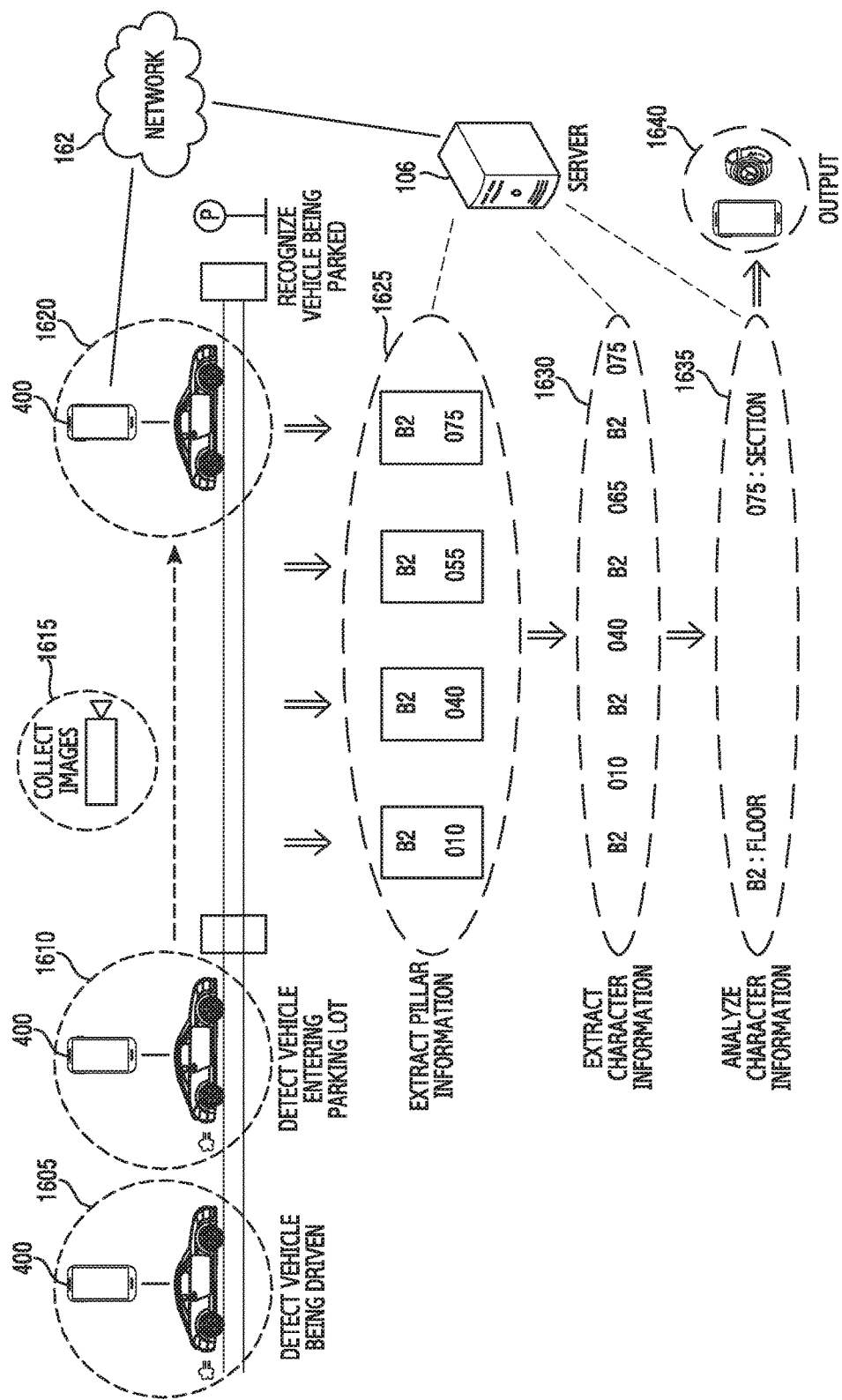
FIG. 16 illustrates an example of a procedure of providing parking location information of a vehicle according to various embodiments of the present disclosure.

FIG. 16 illustrates an example of a procedure of providing parking location information of a vehicle according to various embodiments of the present disclosure. In FIG. 16, it is assumed that the electronic device 400 collects images when the vehicle enters a parking lot. In addition, it is assumed that the electronic device 400 and the server 106 provide information regarding a parking location of the vehicle in cooperation with each other. For example, the electronic device 400 may transmit or receive information related to providing parking location of a vehicle using the server 106 and the network 162.

The electronic device 400 may detect whether the vehicle is driven (step 1605). For example, the electronic device 400 may detect whether the vehicle is driven by analyzing a state of a Bluetooth connection with the vehicle or a vibration pattern of the vehicle, or by receiving vehicle state information from an external device (for example, OBD-2, a black box, or the like) installed in the vehicle. The operation related to detecting whether the vehicle is driven (step 1605) may be similar to the operation in step 505 of FIG. 5.

The electronic device 400 may detect whether the vehicle enters a parking lot (step 1610). For example, the electronic device 400 may detect whether the vehicle enters the parking lot by measuring a GPS signal, illuminance or a geomagnetic change value. The operation related to detecting whether the vehicle enters the parking lot (step 1610) may be similar to the operations in step 510 of FIG. 5, step 605 of FIG. 6, and step 705 of FIG. 7.

When it is determined that the vehicle enters the parking lot, the electronic device 400 may collect images (step 1615). For example, when it is determined that the vehicle enters the parking lot, the electronic device 400 may obtain images regarding the parking lot using the camera module 418 or an external device installed in the vehicle (for example, a black box or the like). According to various embodiments, the electronic device 400 may continue to collect images until the vehicle is parked or exits from the parking lot without being parked. The operation related to collecting the images (step 1615) may be similar to the operations in step 515 of FIG. 5, step 610 of FIG. 6, and step 710 of FIG. 7.

The electronic device 400 may recognize a parking state of the vehicle (step 1620). For example, the electronic device 400 may recognize the parking state of the vehicle by receiving a Bluetooth connection state or a vibration state of the vehicle, or by receiving vehicle state information from an external device (for example, OBD-2, a black box, or the like) installed in the vehicle. The operation related to recognizing the parking state of the vehicle (step 1620) may be similar to the operations in step 520 of FIG. 5, step 620 of FIG. 6, and step 715 of FIG. 7.

The electronic device 400 may transmit the images collected in step 1615 to the server 106. Accordingly, the server 106 may extract pillar information using the received images (step 1625). Herein, the pillar information may be pillar information including information related to a parking location. In this case, the server 106 may recognize the pillar information in the image information using an edge or color characteristic, or may recognize the pillar information from various pillar images through a machine learning technique using a learned model. For example, the server 106 may extract first pillar information (B2 010), second pillar information (B2 040), third pillar information (B2 055), and fourth pillar information (B2 075) from the collected images. Herein, B2 refers to a second basement and 010, 040, 055, and 075 refer to parking sections. According to various embodiments, the server 106 may detect identification information displaying the parking location of the vehicle in the parking lot in addition to the pillars. According to various embodiments, the server 106 may extract pillar information using the pillar information extraction technique described in FIGS. 9 to 12.

The server 106 may extract character information from the pillar information extracted in step 1625 (step 1630). According to various embodiments, the server 106 may extract the character information using the character information extraction algorithm described in FIG. 14.

The server 106 may analyze the character information extracted in step 1630 (step 1635). For example, the server 106 may classify the extracted character information based on the frequency of the extracted character information. Specifically, the server 106 may classify the character information (B2 075) regarding a final parking location into floor information B2 and section information 075 based on the number of times the character information is extracted. According to various embodiments, the server 106 may analyze the character information using the character information analysis algorithm described in FIG. 15.

The server 106 may transmit the character analysis information generated in step 1635 to the electronic device 400. Accordingly, the electronic device 400 may output parking location information generated based on the received character analysis information (step 1640). For example, the electronic device 400 may output the parking location information of the vehicle as visual information or voice information using the display 408 or the input and output unit 420. Alternatively, the electronic device 400 may transmit the parking location information of the vehicle to another device (for example, a wearable device, a galaxy gear, or the like). The operation related to outputting the parking location information (step 1640) may be similar to the operations in step 540 of FIG. 5, step 635 of FIG. 6, and step 730 of FIG. 7.

In FIG. 16, after receiving all of the obtained images from the electronic device 400, the server 106 performs pillar information extraction (step 1625), character information extraction (step 1630), and character information analysis (step 1635). However, according to various embodiments, the server 106 may perform pillar information extraction, character information extraction, and character information analysis in real time by receiving the images from the electronic device 400 every time the images are collected after the vehicle enters the parking lot. In this case, the server 106 may transmit the result of analyzing to the electronic device 400 every time the analysis finishes.

In addition, in FIG. 16, the server 106 performs all of the pillar information extraction (step 1625), the character information extraction (step 1630), and the character information analysis (step 1635). However, according to various embodiments, the electronic device 400 may perform pillar information extraction (step 1625) with respect to the obtained images and then transmit the result of the extraction to the server 106. In this case, the server 106 may receive the result of the extraction from the electronic device 400 and perform the character information extraction (step 1630) and the character information analysis (step 1635).

In addition, according to various embodiments, the electronic device 400 may perform the pillar information extraction (step 1625) and the character information extraction (step 1630) with respect to the obtained images, and then transmit the result of the extraction to the server 106. In this case, the server 106 may receive the result of the extraction from the electronic device 400 and perform the character information analysis (step 1635).

According to the parking location identifying procedure described above with reference to FIG. 16, pillar information is extracted from images. Herein, the pillar refers to an object which displays information regarding a parking location. That is, in the description of FIG. 16, the pillar is merely an example, and, according to various embodiments, an object extracted from the image may be substituted with an object other than the pillar. For example, at least one object including information regarding a parking location may be a structure constituting a parking lot or a part of the structure (for example, a pillar, a wall, a floor), an installation installed in the parking lot (for example, a sign board, an electronic display board, a printed matter, or the like), or a similar physical object including information regarding a parking section.

Information regarding the object may be extracted based on a morphological characteristic (for example, a form including a vertical line, a form including a horizontal line, a form including a curved line, or the like) owned by the at least one object. Accordingly, the object may be defined as an object having a form, a shape, or color of a predetermined pattern. For example, when the at least one object is a pillar, the processor 402 may extract image information regarding the pillar of the parking lot from the obtained image information based on the morphological characteristic of the pillar including a vertical form.

The object extracted from the image refers to a part of an image that has a high possibility of having information regarding a parking location. Accordingly, extracting the information on the object from the image may refer to extracting a region including location information in the parking lot from the image. That is, extracting the information regarding the object from the image may be interpreted as having the same meaning as generating a partial image including location information.

Figure 17:
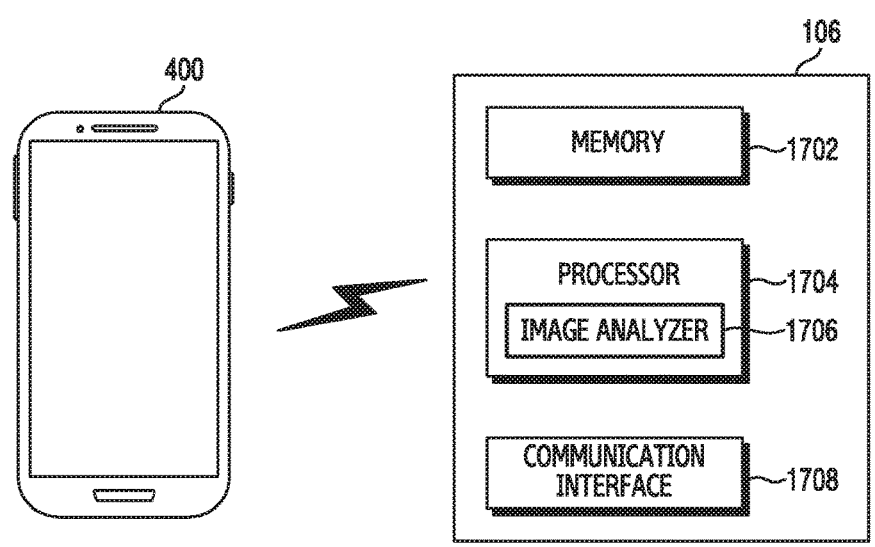
FIG. 17 illustrates an example of a functional configuration of a server according to various embodiments of the present disclosure.

FIG. 17 illustrates an example of a functional configuration of the server 106 according to various embodiments of the present disclosure. Referring to FIG. 17, the server 107 may perform data communication with the electronic device 400.

According to various embodiments, the server 106 may include a memory 1702, a processor 1704, and a communication interface 1708. In addition, the processor 1704 may include an image analyzer 1706. According to a certain embodiment, the server 106 may omit at least one of the elements or further include other elements.

The memory 1702 may include a volatile memory and/or a non-volatile memory. The memory 1702 may store a command or data related to at least one of the other elements. The memory 1702 may store one or more programs executed by the processor 1704 and may perform a function of temporarily storing inputted/outputted data. According to various embodiments, the memory 1702 may serve to store obtained data, may store data obtained in real time in a temporary storage device, and may store data which is determined to be stored in a storage device which is capable of storing for a long time. The memory 1702 may include a computer readable recording medium having a program recorded thereon, for executing the methods according to various embodiments in the processor 1704.

According to various embodiments, the memory 1702 may store information related to a parking location of a vehicle which is received from the electronic device 400. For example, the memory 1702 may store an image received from the electronic device 400, pillar information related to a parking location, character information related to a parking location, or information including a result of analyzing for providing a parking location.

According to various embodiments, the memory 1702 may store data related to a parking section of a parking lot. For example, the memory 1702 may include database (DB) information including information related to a parking section of a parking lot. In addition, the DB information may include an input regarding floor information and an input regarding section information separately.

The processor 1704 may perform arithmetic operations or data processing regarding control and/or communication of at least one of the other elements of the server 106. According to various embodiments, the processing (or controlling) operation of the processor 1704 will be described in detail with reference to the drawings, which will be described below.

The processor 1704 may include the image analyzer 1706. The configuration of the image analyzer 1706 may be similar to the configuration of the image analyzer 406 of FIG. 4B. For example, the image analyzer 1706 may include an object extraction module, a character extraction module, and a character analysis module.

According to various embodiments, the processor 1704 may receive image information from the electronic device 400. Herein, the image information may be image information which is obtained in the electronic device 400 after the vehicle enters a parking lot.

According to various embodiments, the processor 1704 may analyze the image information received from the electronic device 400. Specifically, the processor 1704 may extract pillar information from the image information received from the electronic device 400, extract character information from the extracted pillar information, and analyze the extracted character information.

According to various embodiments, the processor 1704 may receive, from the electronic device 400 using the communication interface 1708, at least one of the images obtained in the parking lot, pillar information extracted from the obtained images, and character information extracted from the extracted pillar information. In addition, the processor 1704 may transmit information including a result of analyzing related to a parking location of the vehicle to the electronic device 400 using the communication interface 1708.

The communication interface 1708 may establish communication between the electronic device 400 and another external device. In this case, the communication interface 1708 may use the network 162 which is connected via wireless communication or wire communication.

Figure 18:
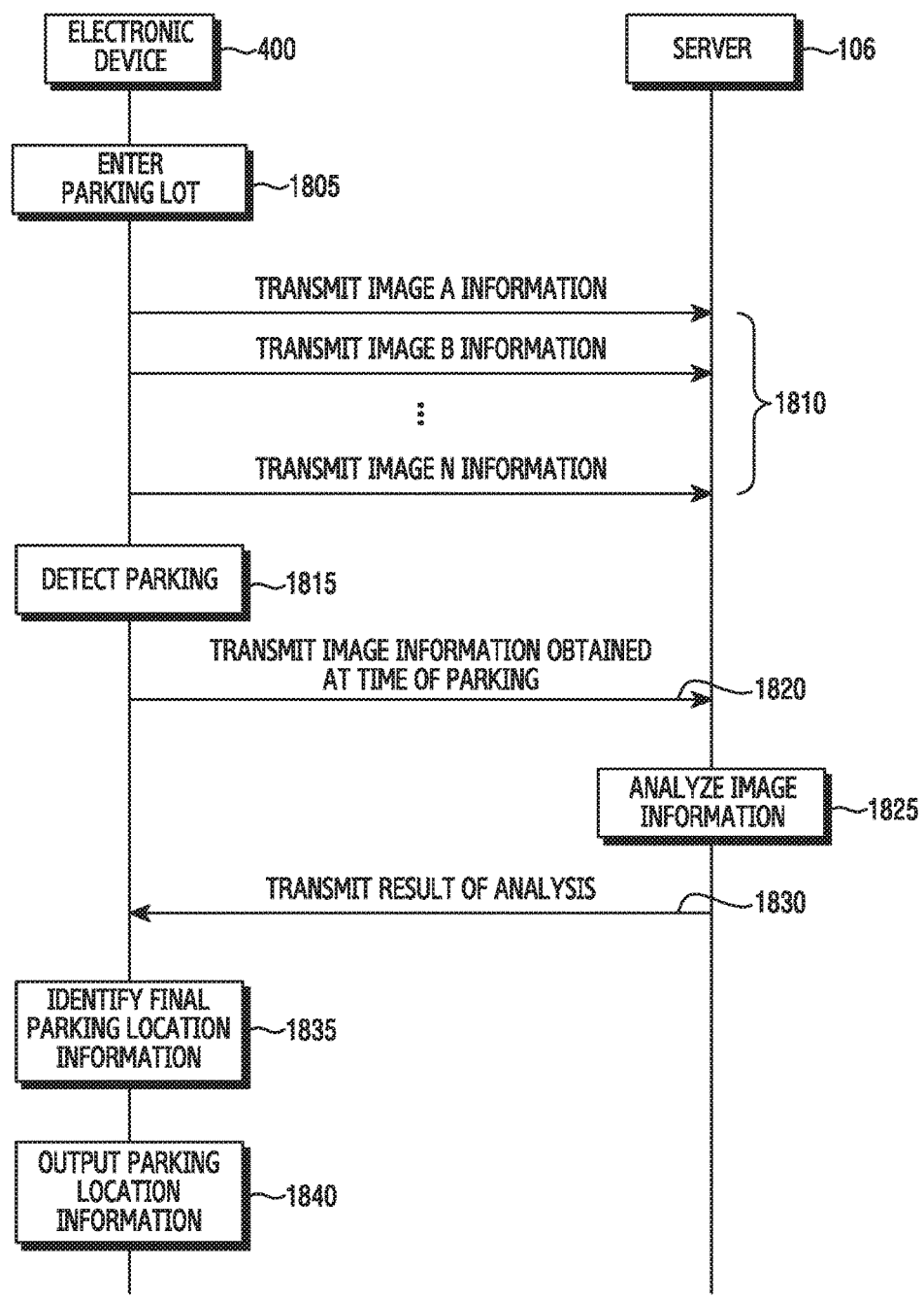
FIG. 18 illustrates an example of a signal flow between the electronic device and the server according to various embodiments of the present disclosure.

FIG. 18 illustrates an example of a signal flow between the electronic device 400 and the server 106 according to various embodiments of the present disclosure. In FIG. 18, it is assumed that the server 106 receives image information which is obtained until a vehicle is parked from the electronic device 400 and then analyzes the received image information.

The electronic device 400 may detect that the vehicle enters a parking lot (step 1805). In this case, the electronic device 400 may use a GNSS module (for example, the GNSS module 227) included in the first communication unit 410 and an illuminance sensor (for example, the illuminance sensor 240K), an acceleration sensor (for example, the acceleration sensor 240E), or the like included in the sensor 416.

The electronic device 400 may transmit the image information obtained in the parking lot to the server 106 (step 1810). For example, when the vehicle enters the parking lot, the electronic device 400 may transmit the image information which is obtained using the camera module 418 or an external device (for example, a black box or the like) installed in the vehicle. For example, the electronic device 400 may transmit image A information, image B information to image N information, that is, N number of pieces of image information, to the server 106. Herein, the N number of pieces of image information may be image information which is obtained in time series from the time when the vehicle enters the parking lot until the time when the vehicle is parked.

The electronic device 400 may detect whether the vehicle is parked (step 1815). In this case, to detect whether the vehicle is parked, the electronic device 400 may determine whether a Bluetooth connection is disconnected or whether there exists a vibration of the vehicle.

When the parking of the vehicle is detected, the electronic device 400 may transmit image information obtained at the time when the vehicle is parked to the server 106 (step 1820). For example, when it is detected that the vehicle is parked, the electronic device 400 may obtain an image at the time when the vehicle is parked using the camera module 418 or an external device (for example, a black box or the like) installed in the vehicle.

When the server 106 receives the image information obtained at the time when the vehicle is parked from the electronic device 400, the server 106 may analyze the received image information (step 1825). Specifically, the server 106 may extract pillar information from the image information received from the electronic device 400, extract character information related to a parking location from the extracted pillar information, and analyze the extracted character information. For example, the server 106 may separately generate floor information and section information regarding the parking location of the vehicle by analyzing the extracted character information. According to various embodiments, the server 106 may analyze the received image information using the analysis technique described in FIGS. 9 to 15.

After finishing the analysis of the received image, the server 106 may transmit the result of analyzing to the electronic device 400. In this case, the result of analyzing may include floor information and section information regarding the parking location of the vehicle.

When the electronic device 400 receives the result of analyzing from the server 106, the electronic device 400 may identify final parking location information of the vehicle based on the received result of analyzing (step 1835). Herein, the final parking location information may refer to information indicating a floor and information indicating a section of the parking location of the vehicle. Specifically, when the electronic device 400 receives the result of analyzing like "floor: B2" and "section: 075" from the server 106, the electronic device 400 may identify that the parking location of the vehicle is "B2 075" and then may set an indicator corresponding to "B2 075."

When the final parking location information of the vehicle is identified, the electronic device 400 may output the final parking location information of the vehicle (step 1840). For example, the electronic device 400 may display the parking location information of the vehicle using the display 408.

Alternatively, the electronic device 400 may output voice information related to the final parking location using an audio module (for example, the audio module 280) included in the input and output unit 420. In addition, the electronic device 400 may output voice information using a voice-related application (for example, an S voice).

According to various embodiments, when the final parking location information is identified, the electronic device 400 may output the parking location information of the vehicle using a notification window or an application related to a parking location. Alternatively, the electronic device 400 may output the parking location information of the vehicle only when a user's request (for example, a voice input, a touch input, a character input, or the like) is detected.

In FIG. 18, the server 106 analyzes image information after receiving all pieces of image information from the electronic device 400. However, according to various embodiments, the server 106 may analyze the image information every time image information is received from the electronic device 400. For example, when image A information is received from the electronic device 400, the server 106 may analyze the image A information. In this case, the server 106 may store a result of analyzing the image A information in the memory 1702. In addition, the server 106 may transmit the result of analyzing the image A information to the electronic device 400. That is, the server 106 may analyze the image information received from the electronic device 400 in real time and then transmit the result of analyzing to the electronic device 400.

In FIG. 18, the electronic device 400 transmits the obtained image information. However, according to embodiments, the electronic device 400 may transmit pillar information which is extracted from the image information obtained after the vehicle enters the parking lot to the server 106. For example, the electronic device 400 may obtain the image information after the vehicle enters the parking lot and may extract pillar information from the obtained image information using the pillar extraction algorithm described in FIGS. 9 to 12. After extracting the pillar information, the electronic device 400 may transmit the extracted pillar information to the server 106. In this case, the server 106 may not perform the operation of extracting pillar information in step 1825.

In addition, according to various embodiments, the electronic device 400 may transmit character information extracted from the pillar information to the server 106. The electronic device 400 may extract pillar information from the obtained image information and may extract character information from the extracted pillar information using the character extraction algorithm described in FIG. 14. After extracting the character information, the electronic device 400 may transmit the extracted character information to the server 106. In this case, the server 106 may not perform the operation of extracting pillar information and the operation of extracting character information in step 1825.

Figure 19:
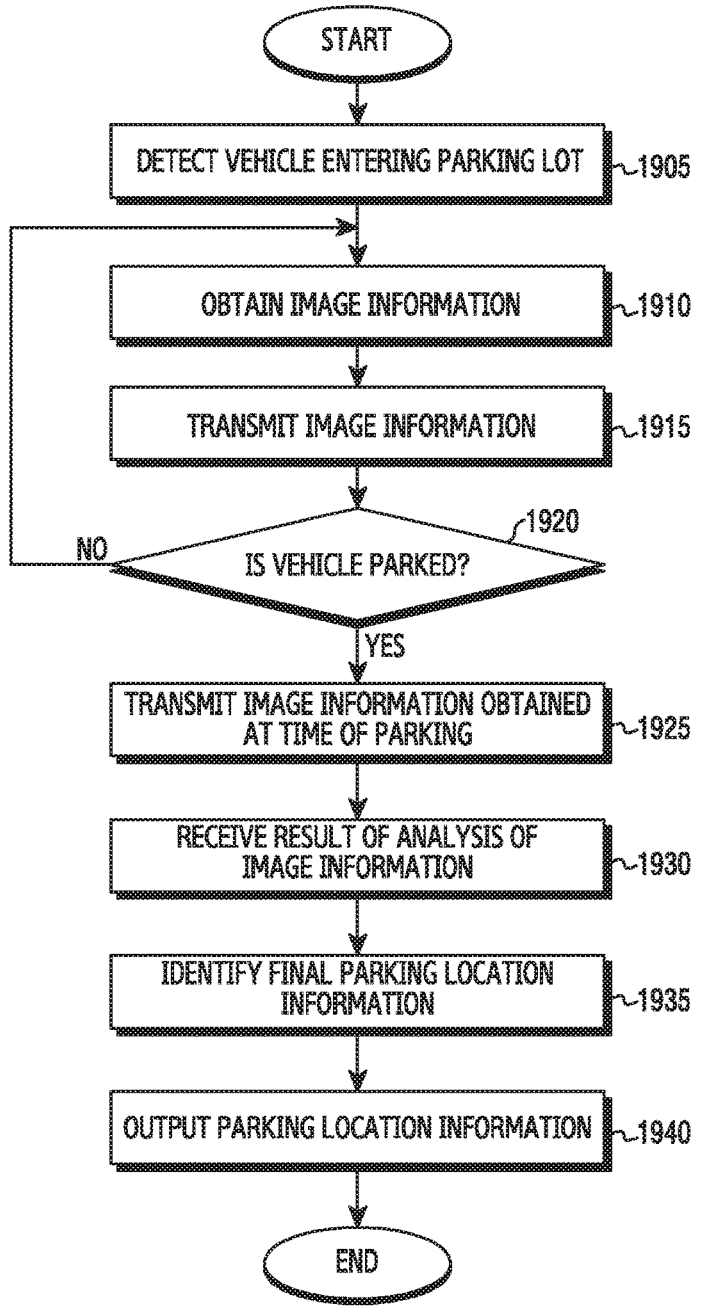
FIG. 19 illustrates an example of an operation process of the electronic device according to various embodiments of the present disclosure.

FIG. 19 illustrates an example of an operation process of the electronic device 400 according to various embodiments of the present disclosure. In FIG. 19, it is assumed that the electronic device 400 transmits image information to the server 106 every time the electronic device 400 obtains image information after the vehicle enters a parking lot. In addition, it is assumed that the electronic device 400 transmits image information obtained until the vehicle is parked to the server 106, and then receives a result of analyzing the image information.

The processor 402 may detect that the vehicle enters the parking lot (step 1905). In this case, the processor 402 may use a GNSS module (for example, the GNSS module 227) included in the first communication unit or an illuminance sensor (for example, the illuminance sensor 240K) or a magnetic sensor (for example, the magnetic sensor 240D) included in the sensor 416. In addition, to determine whether the vehicle enters the parking lot, the processor 402 may receive a beacon signal which is transmitted from an electronic device installed at a specific location of the parking lot. The operation related to detecting whether the vehicle enters the parking lot (step 1905) may be similar to the operations in step 605 of FIG. 6 and step 705 of FIG. 7.

When it is determined that the vehicle enters the parking lot, the processor 402 may obtain image information (step 1910). In this case, to obtain the image information, the processor 402 may use the camera module 418 or receive image information from an external device (for example, a black box or the like) installed in the vehicle using the first communication unit 410. The operation related to obtaining the image information (step 1910) may be similar to the operations in step 610 of FIG. 6 and step 710 of FIG. 7.

When the image information is obtained, the processor 402 may transmit the obtained image information to the server 106 (step 1915). In this case, the processor 402 may use the second communication unit 412.

After transmitting the image information, the processor 402 may determine whether the vehicle is parked (step 1920). For example, the processor 402 may determine whether the vehicle is parked using a Bluetooth module (for example, the BT module 225) included in the first communication unit 410, an acceleration sensor (for example, the acceleration sensor 240E) included in the sensor 416, or an external device (for example, a black box, OBD-2, or the like) installed in the vehicle. The operation related to determining whether the vehicle is parked (step 1920) may be similar to the operations in step 620 of FIG. 6 and step 715 of FIG. 7.

When it is determined that the vehicle is not parked, the processor 402 may return to step 1910 to obtain image information. In this case, the processor 402 may repeatedly perform the procedures of obtaining the image information (step 1910) and transmitting the image information (step 1915) until the vehicle is parked.

On the other hand, when it is determined that the vehicle is parked, the processor 402 may transmit image information obtained at the time when the vehicle is parked to the server 106 (step 1925). In this case, the processor 402 may transmit the image information using the second communication unit 412. In addition, the processor 402 may transmit a plurality of pieces of image information additionally obtained after the vehicle is parked, in addition to the image information obtained at the time when the vehicle is parked. Herein, to obtain the image information, the processor 402 may use the camera module 418 or an external device (for example, a black box or the like) installed in the vehicle.

In addition, according to various embodiments, the processor 402 may transmit an indicator informing that the vehicle is parked to the server 106. For example, the processor 402 may transmit the indicator informing that the vehicle is parked to the server 106 along with the image which is obtained at the time when the vehicle is parked using the second communication unit 412. In this case, the server 106 may recognize that the obtained image is the image obtained at the time when the vehicle is parked based on the indicator informing that the vehicle is parked.

After transmitting the image information obtained at the time when the vehicle is parked, the processor 402 may receive the result of analyzing the image information from the server 106 (step 1930). For example, the processor 402 may receive the result of analyzing using the second communication unit 412. Herein, the result of analyzing may include floor information and section information regarding a parking location of the vehicle. In addition, according to various embodiments, the processor 402 may receive an identifier regarding the parking location of the vehicle from the server 106.

The processor 402 may identify final parking location information of the vehicle (step 1935). Specifically, when the result of analyzing the image information is received from the server 106, the processor 402 may identify the final parking location information based on the result of analyzing. For example, the processor 402 may determine an identifier (or an indicator) regarding floor information and an identifier (or an indicator) regarding section information of the parking lot regarding the final parking location of the vehicle based on the result of analyzing received from the server 106.

When the final parking location information of the vehicle is identified, the processor 402 may output information regarding the parking location of the vehicle (step 1940). In this case, the processor 402 may display the parking location information of the vehicle using the display 408. The vehicle location information of the vehicle may be at least one of an image and character information related to the final parking location of the vehicle. Alternatively, the processor 402 may output voice information related to the final parking location using an audio module (for example, the audio module 280) included in the input and output unit 420. The operation related to outputting the parking location information of the vehicle (step 1940) may be similar to the operations in step 635 of FIG. 6 and step 730 of FIG. 7.

In addition, according to various embodiments, when the final parking location is identified, the processor 402 may display the parking location information of the vehicle using a notification window and an application. Herein, the displayed parking location information of the vehicle may include at least one of character information and image information related to the final parking location.

In the embodiment of FIG. 19, step 1940 is performed after step 1935 without any special condition. However, according to other embodiments, the processor 402 may output the parking location information of the vehicle in response to a user's request additionally or alternatively in step 1935 when the user's request for output of the parking location is detected. For example, when the user requests the parking location of the vehicle in user's voice, the processor 402 may output the information related to the parking location of the vehicle. For example, when the user requests the parking location of the vehicle in user's voice, the processor 402 may output the parking location of the vehicle in a voice using an application.

In addition, according to various embodiments, the processor 402 may display the parking location information of the vehicle through an external device although not shown in FIG. 19. For example, the processor 402 may transmit the parking location information of the vehicle to another device (for example, a wearable device, a galaxy gear, or the like) and display the parking location information of the vehicle using another device.

Figure 20:
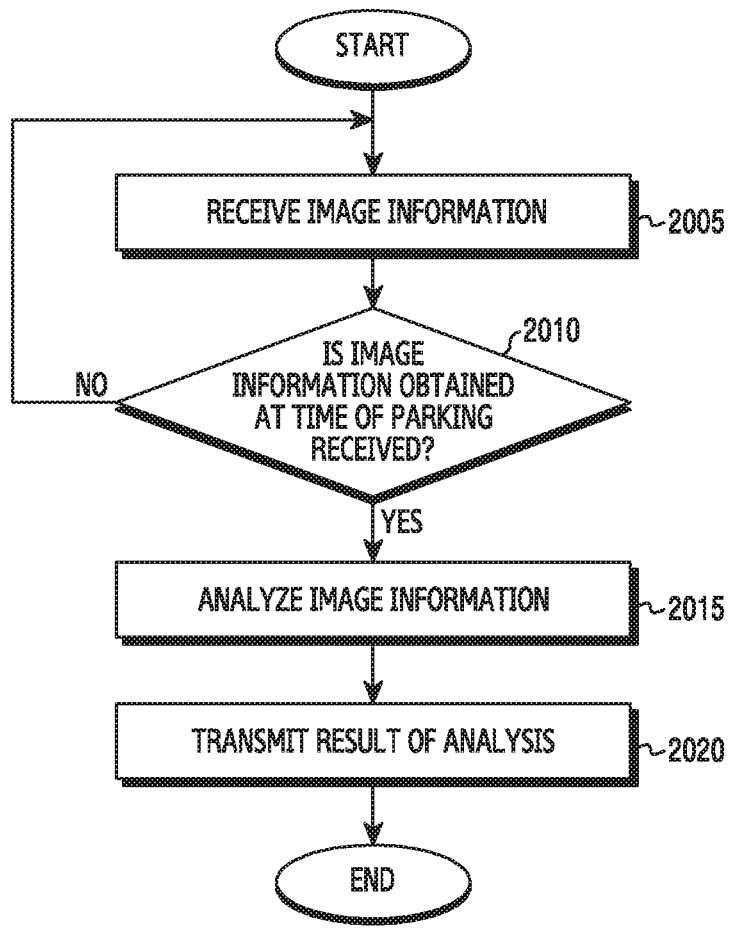
FIG. 20 illustrates an example of an operation process of the server according to various embodiments of the present disclosure.

FIG. 20 illustrates an example of an operation process of the server 106 according to various embodiments of the present disclosure. In FIG. 20, it is assumed that the server 106 receives image information obtained until the vehicle is parked from the electronic device 400 and then analyzes the image information.

The processor 1704 may receive image information from the electronic device 400 (step 2005). For example, the processor 1704 may receive image information obtained after the vehicle enters a parking lot from the electronic device 400 using the communication interface 1708.

The processor 1704 may determine whether an image obtained at the time when the vehicle is parked is received from the electronic device 400 (step 2010). For example, when additional image information is not received from the electronic device 400 after a predetermined time elapses, the processor 1704 may determine that the image obtained at the time when the vehicle is parked is received. In this case, the processor 1704 may additionally recognize image information finally received from the electronic device 400 as the image information at the time when the vehicle is parked. Alternatively, the processor 1704 may determine whether the image obtained at the time when the vehicle is parked is received by receiving an indicator indicating that the vehicle is parked from the electronic device 400.

When the image information obtained at the time when the vehicle is parked is not received, the processor 1704 may return to step 2005 to continuously receive image information from the electronic device 400.

On the other hand, when the image information obtained at the time when the vehicle is parked is received, the processor 1704 may analyze the received image information (step 2015). For example, the processor 1704 may analyze the image information received from the electronic device 400 using the image analyzer 1706.

In this case, the processor 1704 may extract image information of at least one object including information regarding a parking section from the image information received from the electronic device 400. Extracting the image information of the at least one object may refer to generating image information of at least one object in the received image information.

Herein, the processor 1704 may extract the image information of the at least one object including the information regarding the parking section from the obtained image information based on a morphological characteristic (for example, a form including a vertical line, a form including a horizontal line, and a form including a curved line) of the at least one object. In this case, the at least one object including the information regarding the parking section may be a pillar of the parking lot, a sign board installed on the floor of the parking lot, a sign board installed on the ceiling of the parking lot, or a similar physical object including information regarding the parking section. For example, when the at least one object is a pillar, the processor 1704 may extract image information regarding the pillar of the parking lot based on the morphological characteristic of the pillar including a vertical line form.

In addition, after the image information of the at least one object including the information regarding the parking section is extracted, the processor 1704 may extract character information from the extracted image information of the at least one object. In addition, after extracting the character information, the processor 1704 may analyze the extracted character information. Accordingly, the processor 1704 may generate at least one of information indicating a floor and information indicating a section regarding the parking location of the vehicle based on the image information received from the electronic device 400.

According to various embodiments, the processor 1704 may extract pillar information from the received image information, extract character information, and analyze the character information using the algorithms described in FIGS. 10 to 15. Specifically, the processor 1704 may extract image information regarding the pillar based on an algorithm for detecting an edge, may extract character information based on a contour recognition technique and a convolutional neural network technique, and analyze the extracted character information by considering information having numbers and letters matched with each other and based on the frequency of the character information detected from the image information.

When the analysis of the image information finishes, the processor 1704 may transmit the result of analyzing to the electronic device 400. In this case, the processor 1704 may transmit information including the result of analyzing for providing the parking location information of the vehicle using the communication interface 1708.

In the embodiments of FIGS. 19 and 20, the electronic device 400 transmits the image obtained at the time when the vehicle is parked to the server 106, and then receive the result of analyzing the image information from the server 106. However, according to various embodiments, the electronic device 400 may receive the result of analyzing the image information from the server 106 every time the electronic device 400 transmits the image information. In other words, the electronic device 400 may receive the result of analyzing the image information from the server 106 in real time. In this case, when the server 106 receives the image information from the electronic device 400, the server 106 may analyze the received image information promptly and transmit the result of analyzing to the electronic device 400.

In addition, in the embodiments of FIGS. 19 and 20, the electronic device 400 transmits the image information. However, according to various embodiments, the electronic device 400 may transmit a result of processing the image information to the server 106. According to one embodiment, the electronic device 400 may transmit pillar information extracted from the image information or character information extracted from the pillar information to the server 106. In this case, the server 106 may transmit a result of analyzing the information received from the electronic device 400 to the electronic device 400. For example, when the server 106 receives pillar information from the electronic device 400, the server 106 may transmit, to the electronic device 400, information including the result of the analysis which is generated by extracting character information regarding the pillar information and analyzing the extracted character information.

In addition, according to various embodiments, the electronic device 400 may identify the parking location of the vehicle based on the image obtained at the time of parking and database information related to the parking lot and stored in the server 106 although this operation is not illustrated in FIGS. 19 and 20. For example, the electronic device 400 may extract character information from the image obtained at the time of parking and may receive the database information related to the parking lot from the server 106. In this case, the electronic device 400 may extract the character information using the algorithms described in FIGS. 10 to 14, an OCR technique, or various character recognition techniques similar to the aforementioned techniques. Thereafter, the electronic device 400 may identify the parking location of the vehicle based on the extracted character information and the database information. For example, the electronic device 400 may identify floor information and section information regarding the parking location of the vehicle by mapping respective elements of the extracted character information onto information indicating a floor and information indicating a section, which are included in the database information. Specifically, when the extracted character information includes "B3" and the floor information of the database information includes "B1," "B2," and "B3," the electronic device 400 may identify that the floor where the vehicle is parked is "B3" by mapping "B3" included in the character information onto "B3" included in the database information.

Figure 21:
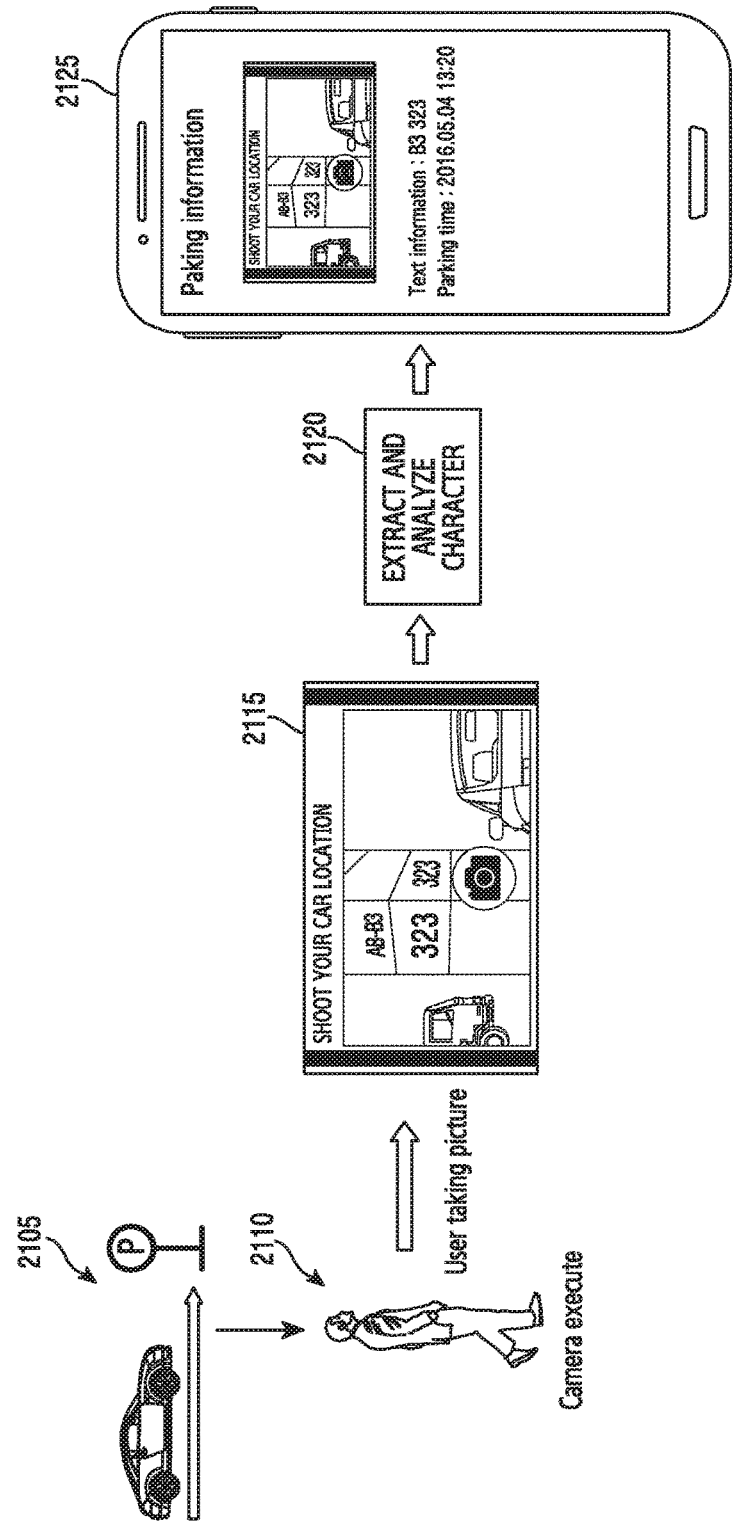
FIG. 21 illustrates an example of a procedure of providing parking location information of a vehicle according to various embodiments of the present disclosure.
Figure 22:
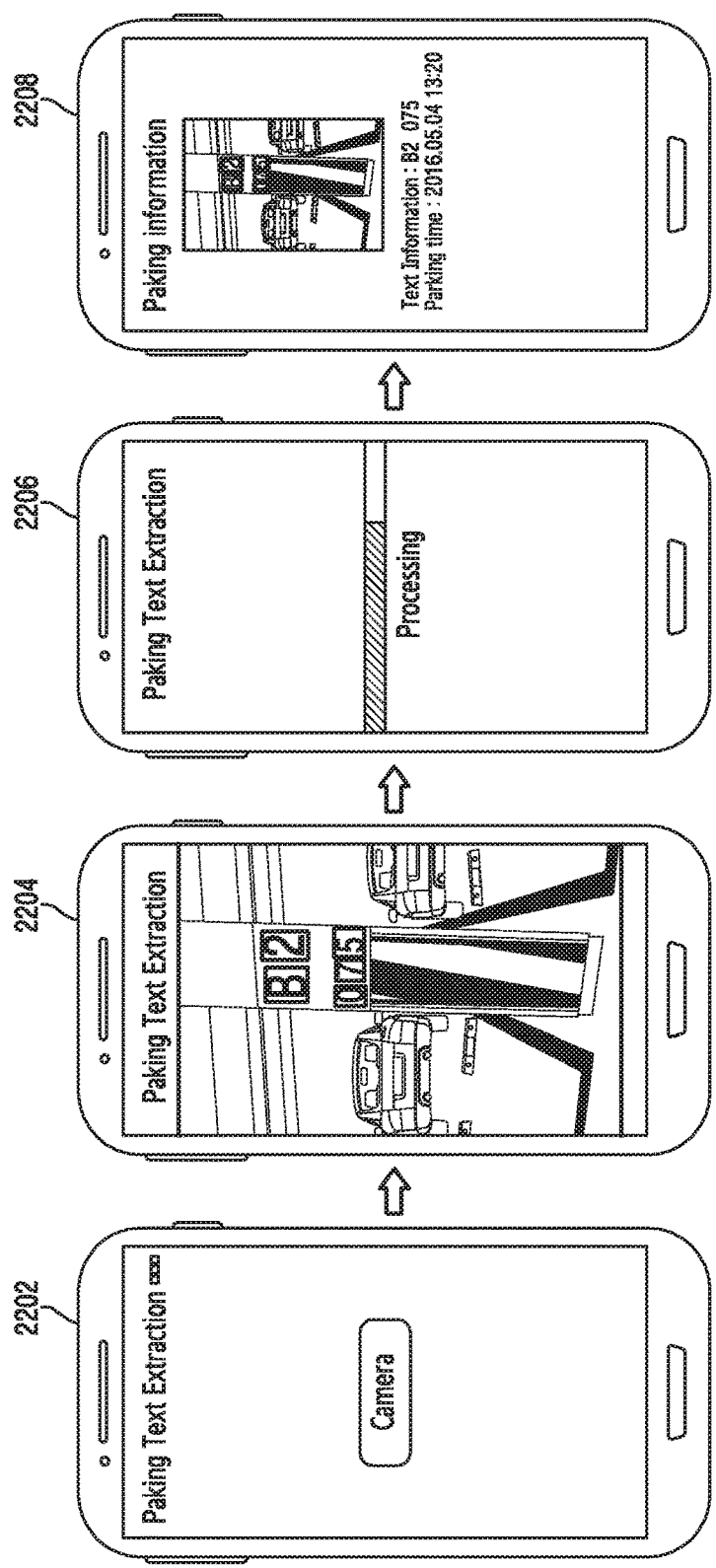
FIG. 22 illustrates an example of a screen for displaying a parking location in the electronic device according to various embodiments of the present disclosure.

FIG. 21 illustrates an example of a procedure of providing parking location information of a vehicle according to various embodiments of the present disclosure. FIG. 22 illustrates an example of a screen displayed on the electronic device 400 according to the procedure of providing the parking location information of the vehicle of FIG. 21. In FIGS. 21 and 22, it is assumed that the user of the electronic device 400 obtains an image related to a parking section after the vehicle is parked.

The electronic device 400 may detect that the vehicle is parked (step 2105). In this case, the electronic device 400 may determine whether a Bluetooth connection with the vehicle is connected or not or may use a vibration pattern of the vehicle detected using an acceleration sensor as described above.

When the parking of the vehicle is detected, the electronic device 400 may automatically execute a camera application (step 2110). In this case, the electronic device 400 may display a camera application execution screen as in step 2202 of FIG. 22. For example, when it is determined that the Bluetooth connection with the vehicle is disconnected based on an analysis of a Bluetooth connection pattern, the electronic device 400 may recognize that the vehicle is parked and thus may automatically execute the camera application. In addition, according to various embodiments, when the camera application is automatically executed, the electronic device 400 may generate a notification signal for the user. Specifically, when the camera application is automatically executed, the electronic device 400 may generate a signal that can be recognized by the user, such as a flickering signal, a vibration signal, a sound signal, or the like.

After the camera application is executed, the electronic device 400 may obtain an image regarding a display indicating a section in which the vehicle is parked using the camera application (step 2115). For example, the electronic device 400 may obtain a plurality of images regarding the display indicating the parking section of the vehicle through a continuous shooting function. When the plurality of images are obtained using the continuous shooting function, the electronic device 400 may perform the character recognition operation more exactly.

When the camera application is executed, the user may shoot an image regarding the display indicating the parking section of the vehicle (step 2115).

When the image is obtained using the camera application, the electronic device 400 may extract character information included in the obtained image and analyze the extracted character information (step 2120). In this case, to extract the character information, the electronic device 400 may use an OCR technique or may use the character information extraction algorithm described in FIG. 14. Herein, when the character information is extracted, the electronic device 400 may display the character portion extracted from the obtained image as in step 2204 of FIG. 22. For example, the electronic device 400 may display "B," "2," "0," "7," and "5" which are recognized as characters in the form of a box.

When the character information is extracted, the electronic device 400 may analyze the extracted character information to generate parking location information of the vehicle. In this case, the electronic device 400 may use the character information analysis algorithm described in FIG. 15. Specifically, the electronic device 400 may generate at least one of information indicating a floor and information indicating a section regarding a location in which the vehicle is parked from the extracted character information. In addition, while the character information is extracted, the electronic device 400 may display a screen informing that the character information is being extracted as in step 2206 of FIG. 22.

When the analysis of the character information included in the image finishes, the electronic device 400 may display information related to the parking location of the vehicle (step 2125). In this case, the electronic device 400 may use the display 408. Herein, the information related to the parking location of the vehicle may include at least one of an image including information of the parking section of the vehicle, character information indicating the parking location of the vehicle, and a parking time of the vehicle. For example, when the analysis of the character information included in the image finishes, the electronic device 400 may display the image displaying the character portion, the character information indicating the parking location of the vehicle, and the parking time of the vehicle as in step 2208 of FIG. 22.

According to various embodiments, the procedure described in FIGS. 21 and 22 may be combined with the above-described procedure when an image is shot after the vehicle enters the parking lot. For example, the electronic device 400 may continue to shoot an image after the vehicle enters the parking lot and may execute the camera application when the vehicle is parked.

According to various embodiments, when an image is obtained using the camera application executed after the vehicle is parked, the electronic device 400 may extract characters from the obtained image and may identify the parking location information of the vehicle by mapping the extracted character information onto database information received from the server 106 although this operation is not illustrated in FIGS. 21 and 22. For example, the electronic device 400 may extract character information "B3" from an image obtained using the camera application, and may identify that the floor on which the vehicle is parked is "B3" by mapping the extracted "B3" onto floor information ("B1," "B2," or "B3") included in the database information received from the server 106.

While specific embodiments have been described in the detailed descriptions of the present disclosure, various changes can be made within a limit without departing from the scope of the present disclosure. Therefore, the scope of the present disclosure should not be limited to and defined by the above-described exemplary embodiments, and should be defined not only by the appended claims but also by the equivalents to the scopes of the claims.

In addition, the embodiments disclosed in the detailed description and the drawings are just suggested to easily explain the present disclosure and assist in understanding the present disclosure, and are not intended to limit the scope of the present disclosure. Therefore, the scope of the disclosure is defined not by the detailed description but by the appended claims, and all changes or differences derived based on the technical idea of the present disclosure should be construed as being included in the scope of the present disclosure.

The apparatus and the method according to various embodiments of the present disclosure can exactly provide a location of a user's parked vehicle while protecting user's privacy using a mobile terminal such as a black box installed in the user's vehicle or a user's smart phone without a sensor and a camera which are pre-installed in a parking lot.

An effect that can be achieved by the present disclosure is not limited to the above-mentioned effects and other effects that are not mentioned could be obviously understood by a person skilled in the art based on the following description.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a memory configured to store instructions; and
a processor configured to execute the instructions to:
  detect that a vehicle enters a parking lot,
  responsive to detecting that the vehicle enters the parking lot, obtain image information,
  generate image information of an object comprising information indicating a parking section based on the obtained image information,
  identify information related to a parking location of the vehicle based on an analysis of the image information of the object, and
  output the information related to the parking location of the vehicle, and
  store at least one of the obtained image information, the image information of the object, or the information related to the parking location of the vehicle.

2. The electronic device of claim 1, wherein the processor is configured to execute the instructions to:
determine a candidate region regarding the object in the obtained image information,
determine whether the object is located in the candidate region, and
when the object is located in the candidate region, determine the candidate region as the image information of the object.

3. The electronic device of claim 2, wherein the processor is configured to execute the instructions to:
extract at least one edge from the obtained image information,
select at least one edge related to a morphological characteristic of the object from the extracted at least one edge, and
determine a region which falls within a predetermined value from the selected at least one edge as the candidate region regarding the object.

4. The electronic device of claim 1, wherein the processor is configured to execute the instructions to:
extract character information from the image information of the object, and
identify the information related to the parking location of the vehicle based on a pattern of the extracted character information.

5. The electronic device of claim 1, wherein the processor is configured to execute the instructions to identify information indicating a floor and information regarding a section regarding the parking location of the vehicle.

6. The electronic device of claim 1, further comprising an input and output unit,
wherein the processor is further configured to execute the instructions to:
obtain a user's request using the input and output unit, and
when the user's request is obtained, output the information related to the parking location of the vehicle in response to the user's request using the input and output unit.

7. The electronic device of claim 1, further comprising a communication unit:
wherein the processor is further configured to execute the instructions to transmit the information related to the parking location of the vehicle to a wearable device for display using the communication unit.

8. The electronic device of claim 1, further comprising a camera module:
wherein the processor is further configured to execute the instructions to obtain the image information using the camera module.

9. The electronic device of claim 1, further comprising a communication unit:
wherein the processor is configured to execute the instructions to receive the image information from an external device using the communication unit.

10. The electronic device of claim 1, further comprising a communication unit:
wherein the processor is configured to execute the instructions to transmit the information related to the parking location of the vehicle to a server using the communication unit.

11. The electronic device of claim 1, wherein the information related to the parking location of the vehicle comprises at least one of character information, voice information, and image information.

12. The electronic device of claim 1, wherein the processor comprises:
a state detector configured to detect at least one of whether the vehicle enters the parking lot and whether the vehicle is parked; and
an image analyzer configured to analyze the obtained image information.

13. The electronic device of claim 12, wherein the image analyzer comprises:
an object extraction module configured to generate the image information of the object comprising the information indicating the parking section based on the image information;
a character extraction module configured to extract character information from the generated image information of the object; and
a character analysis module configured to identify the information related to the parking location of the vehicle based on a pattern of the extracted character information.

14. An electronic device comprising:
a communication unit;
a memory configured to store instructions; and
a processor configured to execute the instructions to:
detect that a vehicle enters a parking lot, and
responsive to detecting that the vehicle enters the parking lot, obtain image information; and
transmit the image information to a server using the communication unit;
receive information comprising a result of analyzing the image information from the server using the communication unit;
identify information related to a parking location of the vehicle based on the information comprising the result of analyzing;
output the information related to the parking location of the vehicle; and
store at least one of the image information, the information comprising the result of analyzing, or the information related to the parking location of the vehicle.

15. The electronic device of claim 14, wherein the processor is further configured to execute the instructions to, using the communication unit, receive the result of analyzing the image information.

16. The electronic device of claim 14, wherein the processor is further configured to execute the instructions to, using the communication unit, transmit the information related to the parking location of the vehicle to the server.

17. The electronic device of claim 14, wherein the processor is further configured to execute the instructions to identify information indicating a floor and information indicating a section regarding the parking location of the vehicle.

18. A method for operating of an electronic device, the method comprising:
detecting that a vehicle enters a parking lot;
responsive to detecting that the vehicle enters the parking lot, obtaining image information;
generating image information of an object comprising information indicating a parking section based on the obtained image information;
identifying information related to a parking location of the vehicle based on an analysis of the image information of the object; and
outputting the information related to the parking location of the vehicle.

19. The method of claim 18, wherein generating the image information of the object comprising the information indicating the parking section based on the obtained image information comprises:
determining a candidate region regarding the object in the obtained image information;
determining whether the object is located in the candidate region; and
when the object is located in the candidate region, determining the candidate region as the image information of the object.

20. The method of claim 19, wherein determining the candidate region regarding the object in the obtained image information comprises:
extracting at least one edge from the obtained image information;
selecting at least one edge related to a morphological characteristic of the object from the extracted at least one edge; and
determining a region which falls within a predetermined value from the selected at least one edge as the candidate region regarding the object.

* * * * *